United States Patent
Roman et al.

(10) Patent No.: US 7,135,679 B2
(45) Date of Patent: Nov. 14, 2006

(54) METHOD AND SYSTEM FOR ENHANCED RADIATION DETECTION

(75) Inventors: Jorge Roman, Carlsbad, CA (US); Gregory W. Schmidt, deceased, late of Encinitas, CA (US); by Mary Jean Schmidt, legal representative, Encinitas, CA (US); William Schmidt, Encinitas, CA (US); Robert Fryer, Solana Beach, CA (US)

(73) Assignee: ThermoPhotonics Inc., Carlsbad, CA (US)

( * ) Notice: Subject to any disclaimer, the term of this patent is extended or adjusted under 35 U.S.C. 154(b) by 0 days.

(21) Appl. No.: 11/005,671

(22) Filed: Dec. 6, 2004

(65) Prior Publication Data

US 2006/0118720 A1    Jun. 8, 2006

(51) Int. Cl.
*G02F 1/13* (2006.01)
(52) U.S. Cl. ..................................... 250/331
(58) Field of Classification Search ................ 250/331, 250/332
See application file for complete search history.

(56) References Cited

U.S. PATENT DOCUMENTS

| | | | |
|---|---|---|---|
| 4,427,888 A | 1/1984 | Galvin | |
| 4,751,387 A | 6/1988 | Robillard | |
| RE33,914 E | 5/1992 | Robillard | |
| 5,508,145 A | 4/1996 | Robillard | |
| 5,512,748 A | 4/1996 | Hanson | |
| 5,710,428 A | 1/1998 | Ko | |
| 5,895,581 A * | 4/1999 | Grunwald | 216/13 |
| 6,465,784 B1 * | 10/2002 | Kimata | 250/332 |
| 6,547,406 B1 | 4/2003 | Greenaway et al. | |
| 2003/0101006 A1 * | 5/2003 | Mansky et al. | 702/30 |

FOREIGN PATENT DOCUMENTS

| | | |
|---|---|---|
| GB | 2125573 A | 3/1984 |
| GB | 2125982 A | 3/1984 |
| GB | 2393796 A | 4/2004 |

OTHER PUBLICATIONS

Tezcan et al., "A Low-Cost Uncooled Infrared Microbolometer Detector in Standard CMOS Technology", IEEE Transactions on Electron Devices, vol. 50, No. 2, pp. 494-502, Feb. 2003.
Stasiek et al., "Thermochromic Liquid Crystals Applied for Heat Transfer Research", Opto-Electronics Review 10(1), pp. 1-10, 2002.
Kowalewski, "Particle Image Velocimetry and Thermometry Using Thermochromic Liquid Crystals", IPPT PAN, Polish Academy of Sciences, Center of Mechanics and Information Technology, 1999.

* cited by examiner

*Primary Examiner*—David Porta
*Assistant Examiner*—Marcus Taningco
(74) *Attorney, Agent, or Firm*—Townsend and Townsend and Crew

(57) ABSTRACT

A method and apparatus for improving detection of radiation emitted from object that includes a radiation detection sensor with a substrate and an array of columns protruding from a top surface of the substrate. A radiation sensitive layer, such as TLC, and a thermal conversion material, such as an absorber, are disposed upon a top surface of the columns within the array thereby producing an array of radiation detectors. The columns provide thermal isolation between the radiation detectors and the substrate, and spatial separation of columns within the array provide radiant and thermal isolation between the radiation detectors upon the tops of individual columns. Producing an image of the array of radiation detectors allows detection of the radiation emitted from an object.

20 Claims, 25 Drawing Sheets

METHOD AND SYSTEM FOR ENHANCED RADIATION DETECTION

BACKGROUND

1. Field

The present invention relates generally to radiation detection systems and in particular to enhanced resolution radiation detection.

2. Description of the Related Art

Detection of radiation that is emitted from objects and is outside of the visible spectrum can provide useful information. For example, detection systems have been developed for sensing infrared radiation (IR) from an object or source in a target space. Infrared imagers, also called thermal imagers, are instruments that create images of heat instead of light, by converting radiated IR energy to a corresponding map of temperatures or radiance. IR sensing applications including temperature measurement and mapping, forest fire sensing and suppression, and surveillance.

Thermal imaging systems are generally constructed from a variety of different types of infrared detectors. Infrared detectors can be classified as cooled or uncooled. Uncooled detectors include thermal sensors that generate a change in a physical parameter of the detector, such as resistance, due to a change in detector temperature resulting from incident infrared radiation. Cooled detectors include infrared sensors where the change in the physical parameter of the sensor is due to a photoelectron interaction within the material of the sensor.

To detect thermal variation across a target space, thermal imaging systems often use two-dimensional arrays of infrared detectors. In a typical thermal imaging system, the radiation from a target space object will be focused onto a detector array. Electronic or mechanical scanners are generally employed to measure the radiation detected by each detector in the array and thereby produce a two-dimensional display corresponding to a thermal map of the object being imaged. The size and active area of each sensor in the array limits the spatial resolution of the imaging system. Likewise, the need to make electrical connection to the individual detectors, for example to measure a resistance change, can increase system complexity as well as impose constraints on the minimum size for the detectors.

Liquid crystal materials can change color in response to received thermal energy. Typically, liquid crystal materials are used for indicating thermal change and are supplied in film form, or as a coating. In a typical application, a liquid crystal film or coating may be applied to a radiating surface of an object for direct sensing of surface temperature by observing variations in color across the liquid crystal material as a result of the object's surface temperature profile.

Because liquid crystal films are not made up of individual detectors, they do not have the drawback of being limited by a minimum detector size. Also, because liquid crystal films are directly viewed, there is not the need for electrical connections to detect changes in physical parameters. However, liquid crystal films suffer from poor resolution because the thermal energy "bleeds" across the film or coating.

Thus, a need exists for improved methods and apparatus for the detection of radiation emitted from objects. Other problems with the prior art not described above can also be overcome using the teachings of the present invention, as would be readily apparent to one of ordinary skill in the art after reading this disclosure.

SUMMARY

Embodiments disclosed herein address the above stated need of improving detection of radiation emitted from an object. In accordance with the invention, a radiation detection sensor includes a thermal conversion material that converts incident radiation into heat energy and also includes a plurality of mapping elements, or detectors, each of which receives heat energy from the thermal conversion material in proximity to the mapping element. A thermal map is produced corresponding to the incident radiation energy received by the sensor, in accordance with sufficiently limited lateral energy dispersion between detectors.

In another embodiment, a radiation detection sensor includes a substrate, and protruding from the top surface of the substrate is an array of columns. The sensor includes radiation detectors having a radiation sensitive layer, such as a radiation sensitive film, and a thermal conversion material, such as an absorber, that may be disposed upon a top surface of the individual columns within the array. The columns provide thermal isolation between the radiation detectors and the substrate. Spatial separation of columns within the array provide thermal and radiant isolation between the radiation detectors upon the tops of individual columns. An array of radiation detectors allows detection, or identification, of the radiation emitted from an object.

In one embodiment, the radiation detection sensor has a substrate that is planar. In other embodiments, the substrate may be constructed to be a non-planar shape or constructed of a pliable material so that it can be formed to non-planar shapes. For example, the substrate may be shaped or formed to be concave, convex, or other complex non-planar surfaces.

In another embodiment, the radiation detectors include a radiation sensitive layer comprised of a thermochromic liquid crystal (TLC) material and include a thermal conversion material comprised of an infrared absorbing layer disposed on a top most surface. For example, the absorbing layer may comprise black cupric oxide. In this embodiment, the absorbing layer converts radiation that impinges on it into heat that is detected by the TLC radiation sensitive layer.

The radiation detection sensor may also include thermal elements that are used to control the temperature of the substrate. The substrate may be heated or cooled, for example, using heaters/thermoelectrical coolers so as to enable biasing of the sensor. In another embodiment, the radiation detection sensor may include thermal shunts. The thermal shunts may be placed at various location in the radiation detection sensor, for example, the thermal shunts may be located between the substrate and the base of the columns in the array. The thermal shunts may also be located between a source of radiation input and the array of radiation detectors, for example, in the optics used to focus an image of the radiation source onto the array, or in a plane on top of the radiation detectors. The thermal shunts may also be located between the radiation detectors and the column tops.

The thermal shunts may be controllably operable so as to provide a high thermal conductance path, or a low thermal conductance path, between the substrate and the column/sensor element combination or between the source of the radiation and detectors. In one embodiment the thermal shunts may be constructed from thermoelectric cooler material, such as, bismuth telluride or other types of solid state heating/cooling materials. In addition, thermal shunts may be magnetically or electrically alignable carbon nanotubes and ferrous fluids.

The columns of the radiation detection sensor can be various shapes and sizes. For example, in one embodiment the columns are cylinders. In another embodiment a top surface of the column is larger than the base of the column thereby maximizing the amount of incoming radiation that impinges upon an individual detector. The columns can have any desired cross section, for example, circular, oval, square, rectangular, or any other multi-sided polygon shape desired. In addition, there may be multiple detectors supported by a single column or multiple columns may support a single detector. For example, a detector may have a spherical shape and there may be three columns supporting the detector. Other configurations of detectors and support structures may also be used.

An embodiment of a radiation detection system uses a radiation detection sensor that has multiple radiation mapping elements or radiation detectors. The sensor receives radiated energy emitted by an object and converts the received energy into thermal energy. Then a received thermal energy map of the object is produced.

In one embodiment, a radiation detection system may include a focal plane array that has a substrate and a plurality of columns protruding from the substrate. Radiation detectors are disposed on tops of the plurality of columns thereby creating an array of radiation detectors. In one embodiment the radiation detectors include a thermochromic liquid crystal material. The system also may include collection optics that focus radiation emitted from an object onto the focal plane array. The system may include imaging optics that focus an image of the focal plane array radiation detectors onto an imaging sensor. The imaging sensor may be a video camera, for example, a CCD camera. The system may also include an illumination source that illuminates the focal plane array. The system may also include an environmental control unit. For example, the environmental control unit may operate to maintain a substrate of the focal plane array at a desired temperature, or vacuum, or humidity level or control any combination of environmental characteristics including magnetic field and electric field environments. The system may also include an image processor configured to accept an output from the imaging sensor.

A null sensor radiation detection system may include a focal plane array that includes a substrate and a plurality of columns protruding from the substrate, wherein radiation detectors are disposed on tops of the plurality of columns thereby creating an array of radiation detectors. The system may also include collection optics that focus radiation emitted from an object onto the focal plane array. In addition, the system may include an illumination source configured to illuminate the focal plane array, and imaging optics that focus an image of the array of detectors onto an imaging sensor. An image processor may be configured to accept and analyze the output from the image sensor and generate a command for a controllable radiation source. The command for the controllable radiation source may cause the controllable radiation source to output radiation that is directed to the focal plane array and maintains the detectors at a predetermined value.

A controllable radiation source may also be used to output a known radiation directed to the focal plane array to characterize the sensitivity and response of detectors with the focal plane array. For example, the focal plane array may be exposed to a constant radiation level, a step change in radiation level, a gradient radiation level, or other variable radiation level. In addition, a target with a known radiation profile may be exposed to the focal plane array. For example a target "shutter" may be placed in front of, or in the entrance pupil, of the radiation detector system and thereby be exposed to the focal plane array. The performance of the detectors within the focal plane array when exposed to a known radiation can be evaluated. For example, the performance characteristics of the detectors, such as sensitivity and response to a step, or varying radiation input can be evaluated.

In another embodiment of a radiation detection system a target illumination source illuminates, or "paints" an object. Radiation reflected from the object may then be collected by collection optics and focused onto the focal plane array. The target illumination source may be tunable. For example, the target illumination source may include optics or controls to shape the spectrum of the radiation output by the target illumination source. In another example, the target illumination source may include multiple sources, each of which outputs a desired spectrum of radiation. The output of the target illumination source may be mixed, or combined, in any desired combination so that a desired output spectrum is achieved. In this manner the object may be painted with radiation of a desired spectral content which may improve the detection of specific objects.

Other features and advantages of the present invention should be apparent from the following description of exemplary embodiments, which illustrate, by way of example, aspects of the invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
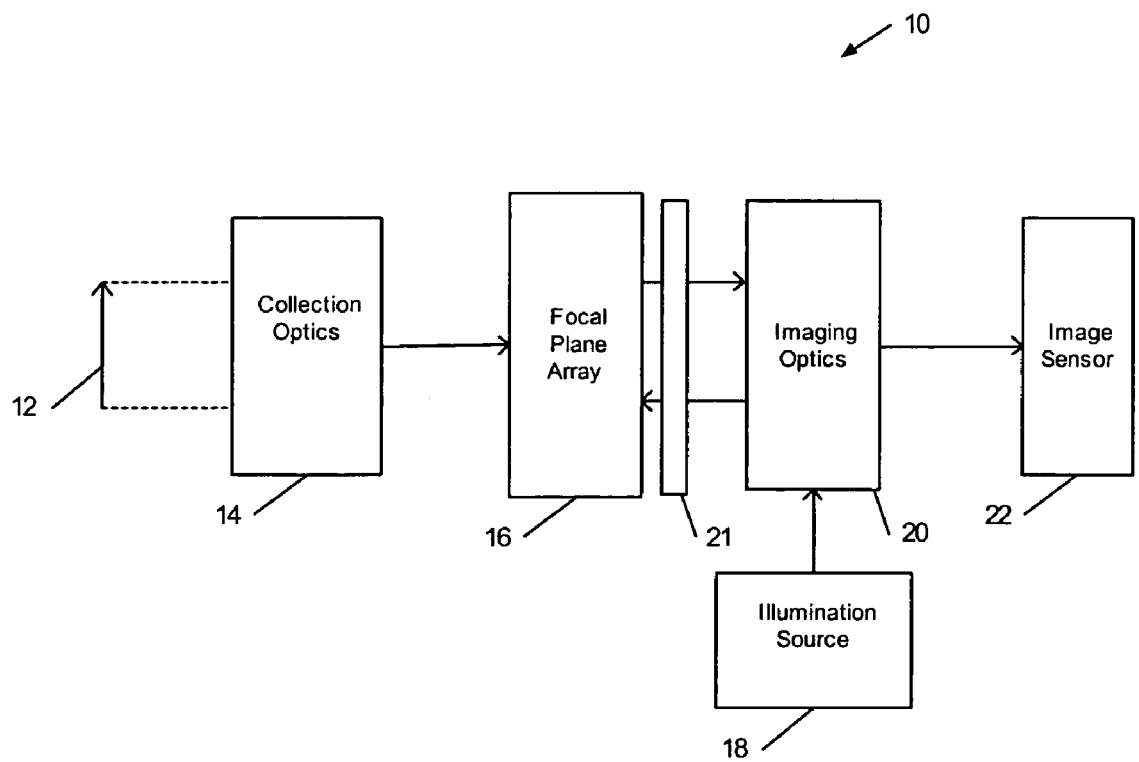
FIG. 1 is a block diagram illustrating an embodiment of a radiation detector system constructed in accordance with the invention.

Techniques and apparatus for improved radiation detection are described. FIG. 1 is a block diagram illustrating an embodiment of a radiation detector system 10 constructed in accordance with the invention. As shown in FIG. 1, radiation emitted from an object 12 is collected by collection optics 14 and focused onto a focal plane array 16. An illumination source 18 provides illumination of the focal plane array 16 and an optical image of the focal plane array 16 is focused by imaging optics 20 onto an image sensor 22.

The object 12 may be any object that emits radiation. For example, the object 12 may emit infrared, visible, ultraviolet, Terahertz, or other radiation. The radiation emitted from the source 12 is collected by appropriate collection optics 14. The collection optics 14 may differ depending on the type of radiation desired to be detected. For example, if it is desired to detect infrared radiation, then the collection optics 14 may be configured so as to pass infrared radiation and block other types of radiation. The collection optics 14 can be configured to pass any desired spectrum of radiation that can be focused by the optical means. For example, if the radiation detection system 10 is configured to be operated in a dark environment, such as at night, the collection optics 14 may be configured to focus all radiation onto the focal plane array 16.

The collection optics 14 are well known in the art, and may be one or more of any number of lenses or other optic components. The collection optics 14 produce a focused image of the object 12 onto the focal plane array 16, so that focal plane array 16 may sense the radiant flux emitted by the object 12. The collection optics 14 may include lenses that are made of various types of optical glasses, and optical coatings, to achieve a desired spectral transmittance. The collection optics 14 may also include other types of optical material so that a desired overall spectral transmittance of the collection optics 14 is achieved. In other words, the collection optics 14 may include any device that focuses radiation within a desired spectrum onto the focal plane array 16. For example, for infrared radiation in the range of approximately 0.6 to 21 microns, Zinc Selenium (Zn Se) lenses and windows with antireflective coatings may be used. In addition, the lenses may be of the type plano convex for image formation upon the focal plane array. The collection optics 14 may also include other optical devices, such as, Fresnel lenses, zone plates, pin hole apertures and fish-eye lenses, biconvex, biconcave, and plano concave.

The focal plane array 16, as described in further detail below, includes a plurality of radiation detectors onto which radiation from the object 12 is detected. Each detector within the focal plane array 16 senses a portion of the field of view of the radiation detection system 10. In other words, each individual detector in the focal plane array 16 represents a single pixel, or mapping element, of the radiation detection system 10.

As described further below, in one embodiment of the focal plane array 16, when exposed to radiation, the individual radiation detectors in the array change color in response to the intensity of the radiation incident upon the individual detector. The illumination source 18 illuminates the focal plane array 16 with minimal disturbance to the incoming radiation. For example, in the path between the illumination source 18 and the focal plane array may be placed an optional filter 21. The filter may be configured to block radiation from the illumination source that the detectors within the focal plane array would sense, while passing other radiation. For example, if the detectors are sensitive to heat, the filter 21 may be configured to block infrared radiation but pass other radiation. In one embodiment, the filter 21 may be constructed of glass which substantially blocks infrared radiation so as to minimize any disturbance, or influence, of the illumination source upon the focal plane array detectors that sense infrared radiation, while still allowing the focal plane array to be imaged through the filter 21.

The illumination source 18 may have a broad or a narrow spectral output. In addition, the illumination source may be tunable. In one embodiment, the illumination source 18 may be constructed of one or more narrow band sources so as to be able to enhance specific response ranges of the detectors. That is, the illumination source may have one or more narrow band sources, such as narrow band LEDs, that output a spectrum matched to a specific spectral range of interest in the spectrum of a thermochromic liquid crystal (TLC) detector. For example, a TLC detector may change color from red to yellow to green to blue as its temperature increases in response to radiation incident on an absorber that is converted to thermal energy. If a particular radiance level, corresponding to a particular color of the TLC, is of interest, then the illumination source may be selected or "tuned" to that particular color. In this way, as the TLC changes to the particular color the sensitivity of the readout of the TLC may be improved. For example, if the radiance level of interest corresponds to a TLC color of green, then the illumination source may be tuned to green. When the TLC is red or yellow or blue, the TLC readout will be low because the source illuminating the TLC does not include these colors. When the TLC changes to green the TLC readout will increase because the illumination source matches the TLC color. Because the TLC readout increases, the sensitivity or the ability to detect small color changes, and corresponding radiation level changes, is improved.

The imaging optics 20 focus an image of the focal plane array 16 detectors onto an image sensor 22. The imaging optics 20 are well known in the art, and may be one or more of any number of lenses or other optic components. The imaging optics 20 produce a focused image of the detectors of the focal plane array 16 onto the image sensor 22. The image sensor 22 then produces an output corresponding to an image of the detectors of the focal plane array 16. The image sensor 22 may be, for example, a camera such as a CCD camera. The image produced by the CCD camera may be displayed to a user, or it may be provided to an image processor for further processing.

Figure 2:
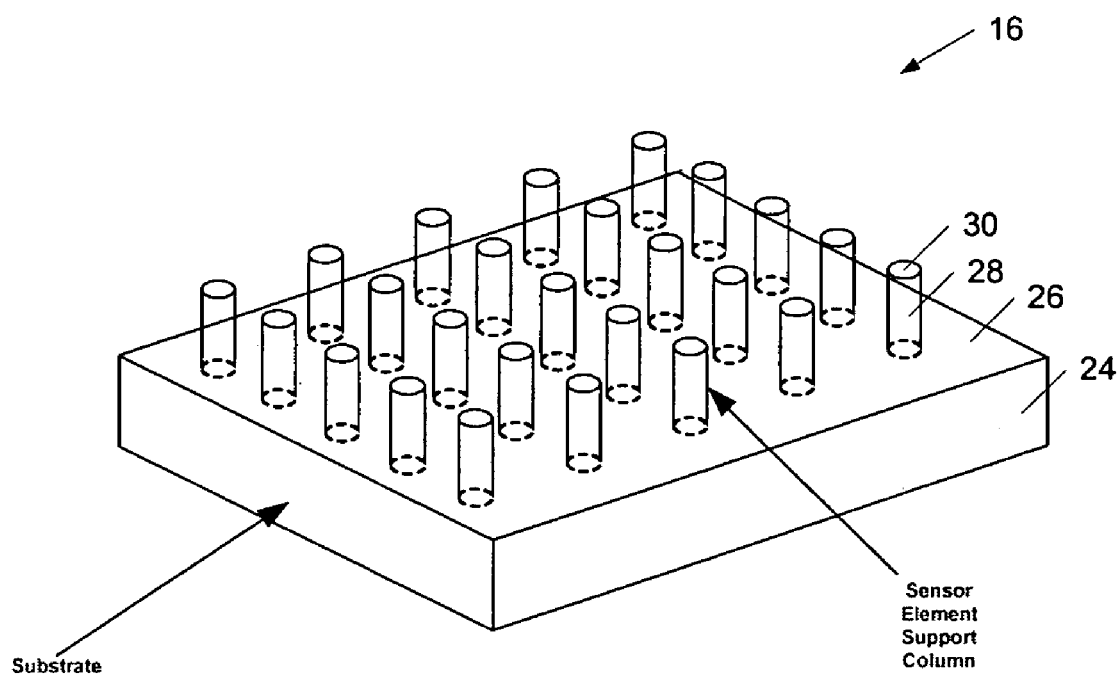
FIG. 2 is an isometric illustration of an exemplary embodiment of a focal plane array 16 constructed in accordance with the invention.

FIG. 2 is an isometric illustration of an exemplary embodiment of a focal plane array 16 constructed in accordance with the invention. As shown in FIG. 2 the focal plane array 16 includes a substrate 24. In the example illustrated in FIG. 2, the substrate 24 is generally the shape of a rectangular slab. Protruding outward from a top surface 26 of the slab are a plurality of columns 28. As described further below, on the top surface 30 of each column 28 a radiation detector is disposed. In this way, each of the columns with the disposed detector corresponds to an individual mapping element, or pixel, of the focal plane array 16.

The columns 28 provide physical support for disposing a radiation detector. Each column 28 also provides thermal isolation between the detectors and the substrate 24. The thermal conductance of the column may be selected to be a desired value. For example, it may be desirable for the column to have a low thermal conductance to thereby provide a high thermal isolation between the detectors and the substrate. But, it may also be desirable to have the column thermal conductance high enough so that there is a thermal path from the detector to the substrate 24 allowing the detector to "bleed off" heat to the substrate when a source of radiation causing the detector to heat is removed. In other words, it may be desirable to select the thermal conductance of the column to be a value that allows a desired amount of heat transfer between the radiation detector and the substrate. This technique may also be used to change the response time of the radiation detection sensor to changes in radiation.

As described further below, the location of the columns 28 relative to one another provide radiant and thermal isolation between individual detectors within the array. There are several tradeoffs to consider in the placement of the columns 28. For example, it is desirable to have the detectors close to each other to increase the active area of the focal plane area, the portion of the focal-plane array covered by detectors, so as to increase resolution. However, it is also desirable to have the columns and detectors separated from adjacent columns and detectors to increase isolation between adjacent detectors and reduce "bleeding" of signals between adjacent detectors. "Bleeding" can have the effect of blurring high contrast detail in the image.

In one embodiment, a radiation detection sensor includes a thermal conversion material that converts radiation into heat energy. The sensor also includes a plurality of mapping elements, or detectors, located on the tops of the columns 28 shown in FIG. 2. Each of the mapping elements, or detectors, receives heat energy from the thermal conversion material, thereby creating a thermal map corresponding to the radiation energy. In another embodiment, individual pieces of thermal conversion material are associated with individual detectors.

One embodiment of a radiation detection system using the described radiation detection sensor, includes receiving radiated energy from an object. The received energy is converted into thermal energy. Then a received thermal energy map of the object is produced.

Figure 3:
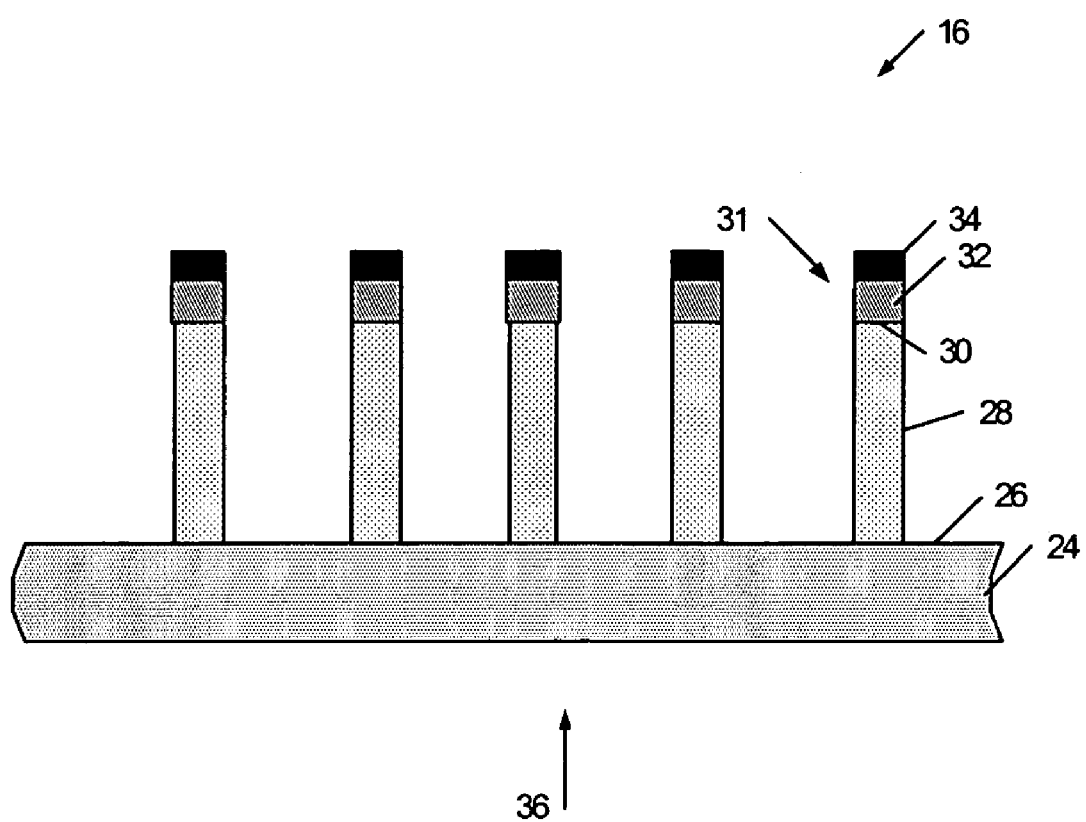
FIG. 3 is a cross sectional view of one embodiment of a focal plane array such as illustrated in FIG. 2.

FIG. 3 is a cross sectional view of one embodiment of a focal plane array 16. As shown in FIG. 3, the focal plane array 16 includes a substrate 24 that has columns 28 protruding from a top surface 26 of the substrate 24. On the top surface 30 of the columns 28 a detector 31 is deposed. In the exemplary embodiment illustrated in FIG. 3, the detector 31 includes a radiation sensitive layer 32. In one embodiment, the radiation sensitive layer is a thermochromic liquid crystal (TLC). In another embodiment the radiation sensitive layer 32 may be mixtures, of blends, of TLC materials with one or more configurations, or ranges of sensitivities. For example, two different TLCs with different red-onset temperatures may be combined within a single detector. In other words, different combinations of TLC materials may be used to construct a radiation sensitive layer with desired characteristics.

In the embodiment of FIG. 3, placed on top of the radiation sensitive layer 32 is a thermal conversion material 34, commonly referred to as an absorber, that converts radiation into heat energy. The absorber 34 converts radiation that impinges upon it into thermal energy that is sensed by the radiation sensitive layer 32. The absorber may be made of black cupric oxide. In general, absorbers may be made of any material that has high absorptivity and low emissivity characteristics. In addition, it is noted that absorber material may be transparent to some radiation while absorbing other radiation. For example, glass may absorb infrared radiation even while it is nearly transparent to radiation in the visible part of the spectrum. Although the absorber has been described as converting radiation into thermal energy, the absorber may be constructed of any type of material that converts radiation into a physical characteristic that can be sensed by the radiation sensitive layer.

In one embodiment, the focal plane array illustrated in FIG. 3 is constructed using an optically transparent material for the substrate 24 and the columns 28. Constructing the substrate 24 and the columns 28 of optically transparent material allows the sensing element to be viewed from the "back" 36 of the focal plane array, as described further below.

Figure 4:
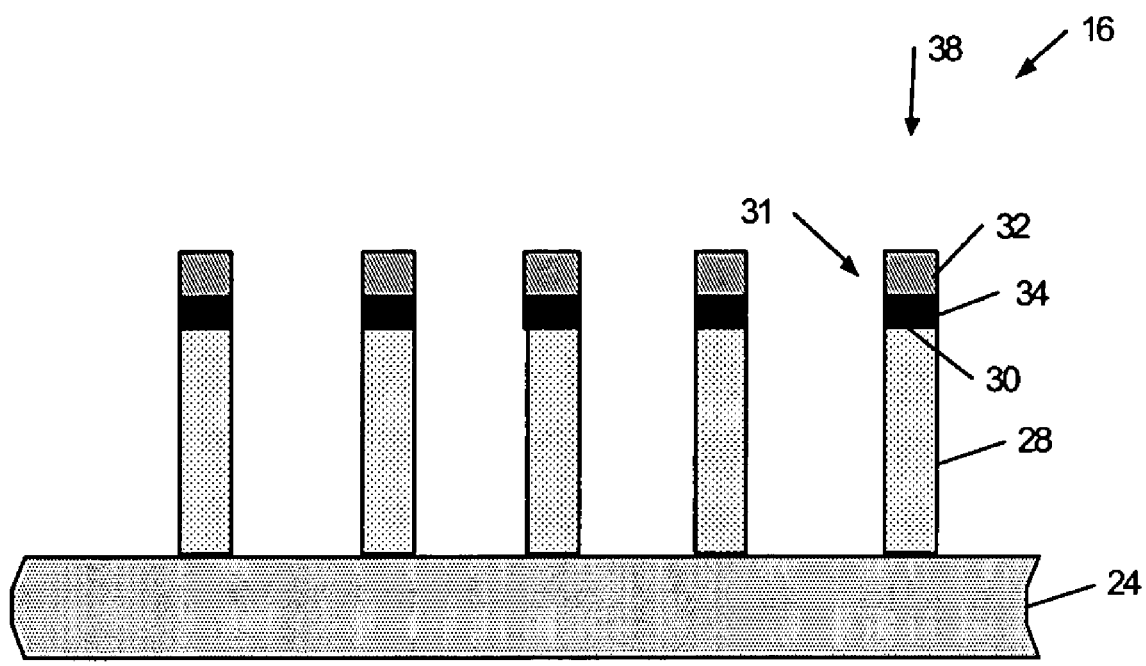
FIG. 4 is a cross sectional view of another embodiment of a focal plane array constructed in accordance with the invention.

FIG. 4 is a cross sectional view of another embodiment of a focal plane array 16. The embodiment of the focal plane array 16 illustrated in FIG. 4 is similar to that illustrated in FIG. 3 except that the absorber 34 is placed on the top 30 of the column 28. The radiation sensitive layer 32 is disposed on top of the absorber 34. Arranging the absorber 34 and radiation sensitive layer 32 in this manner allows the detector 31 to be viewed from the "front" 38 of the focal plane array as described further below.

Figure 5:
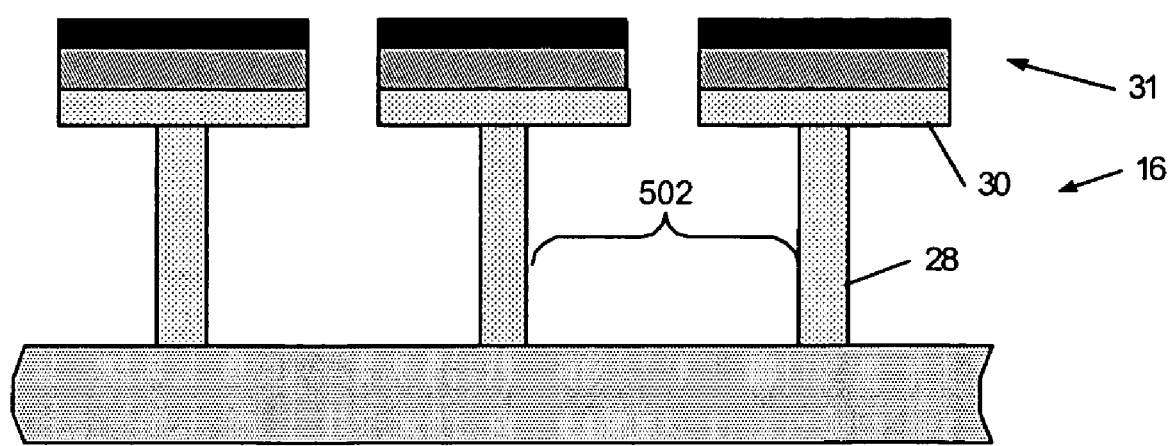
FIG. 5 is a cross sectional view of yet another embodiment of a focal plane array.

FIG. 5 is a cross sectional view of yet another embodiment of a focal plane array 16. In the embodiment of the focal plane area illustrated in FIG. 5, the columns 28 have an expanded area forming the top surface 30 of the column. Having an expanded top surface 30 on the column helps to increase the active area of the focal plane area while providing increased separation 502, and therefore increased isolation, between the regions of the columns 28 beneath the expanded top surface 30. An expanded top surface 30 supports a larger absorber area thereby increasing the received irradiance per pixel. In general, an increase in the irradiance per pixel increases the signal level thereby improving the signal to noise ratio (SNR) of individual detectors. In addition, a narrow column can provide a lower thermal conductance path and thereby improve thermal isolation between the detectors and the substrate.

Figure 6:
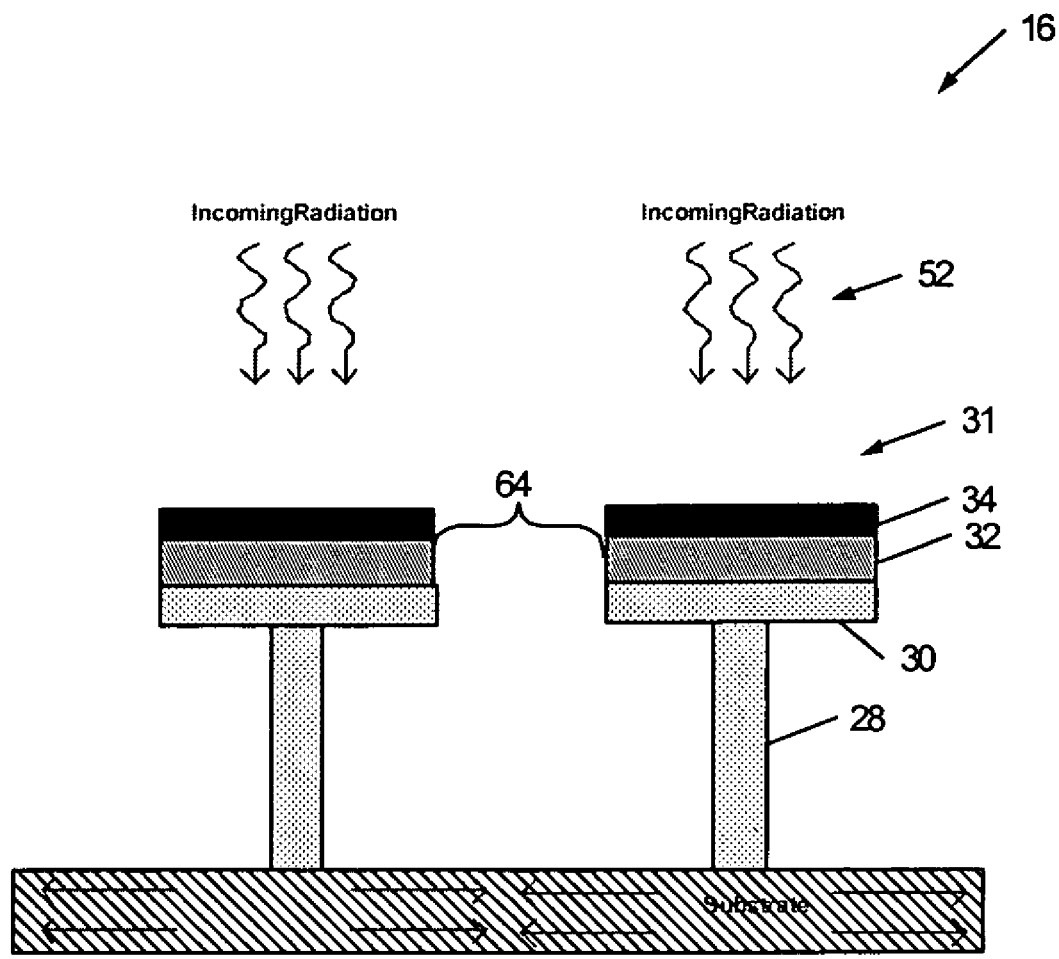
FIG. 6 is a schematic diagram illustrating additional aspects of a portion of the focal plane array.

FIG. 6 is a schematic diagram illustrating additional aspects of a portion of the focal plane array 16. In the example in FIG. 6, the focal plane array 16 is configured with a detector 31 disposed onto the top surface 30 of a column 28. In the embodiment illustrated in FIG. 6, an absorber 34 is placed on top of a radiation sensitive layer 32. Radiation 52 that impinges onto the absorber 34 is converted into thermal energy. As the intensity of the radiation 52 onto the absorber 34 increases, the thermal energy produced by the absorber increases. Likewise, as the intensity of the radiation 52 onto the absorber 34 decreases, the thermal energy produced by the absorber decreases. The radiation sensitive layer 32 detects the level of thermal energy of the absorber 34.

The column 28 provides a low thermal conductance path, i.e. a high thermal isolation path, from the detector 31 to the substrate 24. The low thermal conductance path provides thermal isolation between the detector and the substrate. The separation 64 between the detectors 31, provided by placement of the columns 28, provides thermal and radiant isolation between individual detectors within the focal plane array 16. The thermal and radiant isolation provided by the separation between columns 28 may be provided in many different ways. In one embodiment, the focal plane array 16 can be located within an enclosure that has been evacuated of a substantial portion of air so as to produce a deep vacuum. In another embodiment, the separation 64 between the columns 28 may be filled with a low thermal conductance materials, such as, aerogel material.

In another embodiment, the relative positions of the radiation sensitive layer 32 and absorbers 34 may be changed, as illustrated in FIG. 4. In this embodiment the radiation 52 would pass through the layer 32 and impinge on the absorber 34 which would generate heat that is sensed by the layer 32. The remaining thermal characteristics would be similar to those described in relation to the embodiment of FIG. 5.

Figure 7:
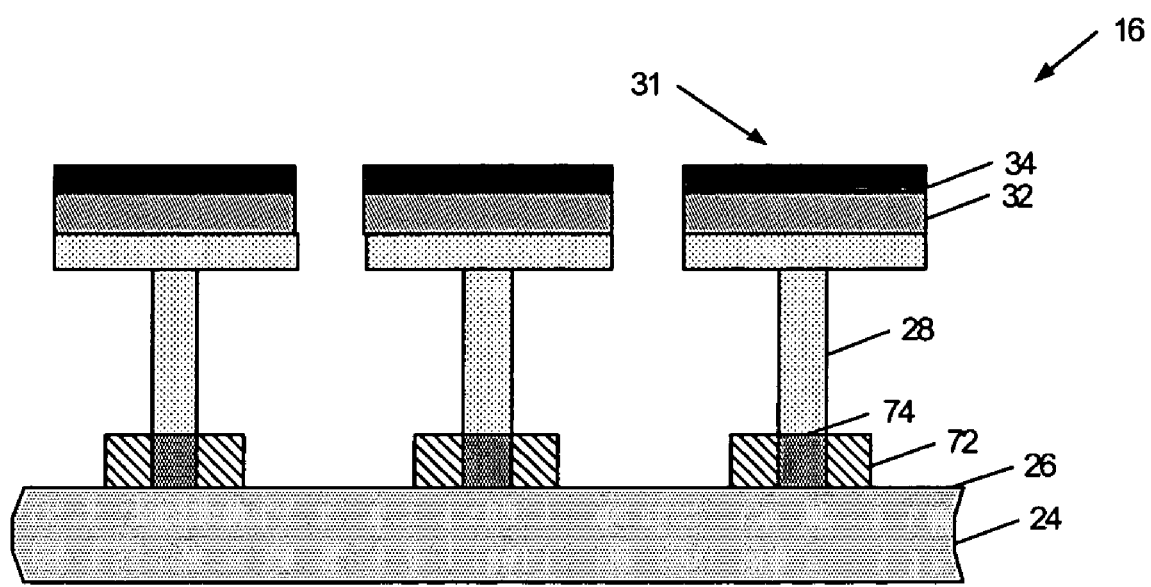
FIG. 7 is a cross sectional view of another embodiment of a focal plane array.

FIG. 7 is a cross sectional view of another embodiment of a focal plane array 16. FIG. 7 includes thermal shunts 72 between the top surface 26 of the substrate 24 and the base 74 of the column 28 The thermal shunt 72 may provide controllably variable thermal conductance paths. For example, the thermal shunts 72 may operate in different states. In one state the thermal shunt 72 may operate to provide a low thermal conductance path, i.e. a high thermal isolation, between the substrate 24 and the column 28. In another state, the thermal shunt 72 may operate to provide a high thermal conductance path, i.e. a low thermal isolation path, between the substrate 24 and the column 28. When the thermal shunt 72 is included the column 28 may be constructed with a high thermal conductance material so that when the thermal shunt 72 provides a high thermal conductance path, the column 28 and sensor element 32 will quickly approach thermal equilibrium with the substrate 24. When the thermal shunt 72 provides a low thermal conductance path, the column 28 and sensor element 32 will be thermally isolated from the substrate 24.

The thermal shunt 72 may be constructed of various types of materials. For example, thermoelectric cooler/heater material, such as bismuth telluride, may be used as the substrate 24 with columns made of a low conductance material sitting on top of the substrate 24. The thermal shunt 72 may also be constructed using carbon nanotubes and a ferrous fluid. Operation of the shunt may be controlled in different ways. For example, if the thermal shunt is constructed of a thermoelectric cooler/heater material, it may be controlled by varying a current through the material using typical electrical control circuits, as are well known. If the thermal shunt is constructed of carbon nanotubes and a ferrous fluid, it may be controlled by a controllable magnetic or electric field.

In other embodiments the relative positions of the radiation sensitive layer 32 and absorbers 34 may be changed, as illustrated in FIG. 4.

Figure 8:
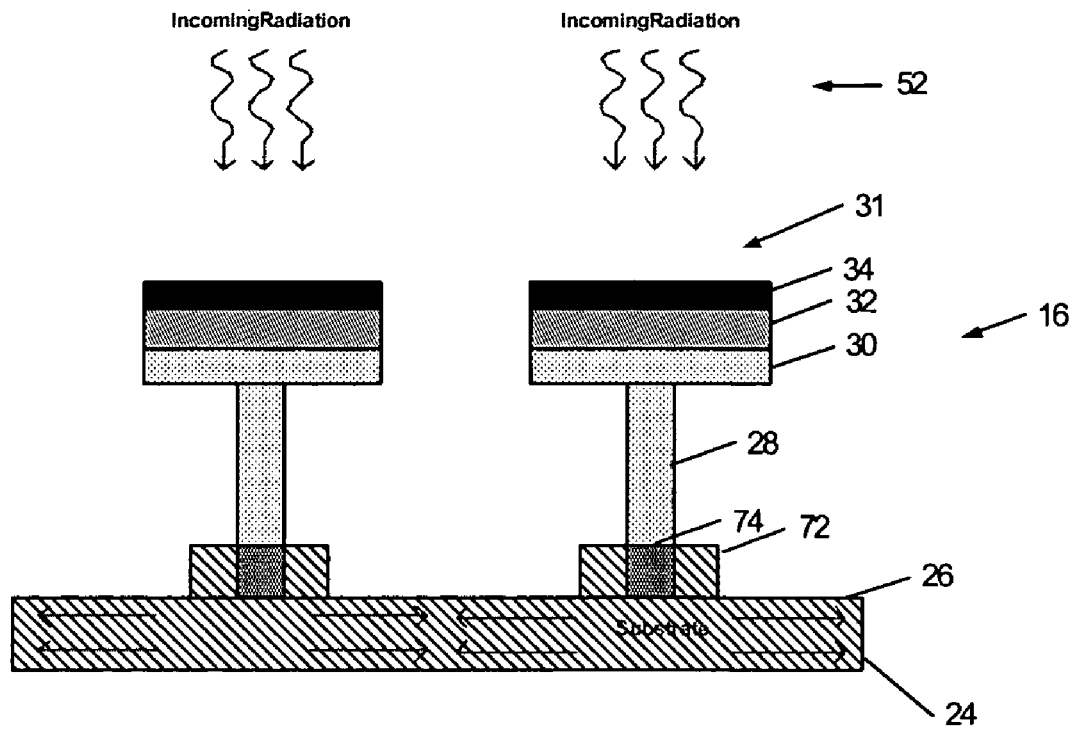
FIG. 8 is a schematic diagram illustrating additional aspects of a portion of the focal plane array.

FIG. 8 is a schematic diagram illustrating additional aspects of a portion of a focal plane array 16. The example in FIG. 8 illustrates the focal plane array 16 configured with detectors 31 constructed with a radiation sensitive layer 32 disposed onto the top surface 30 of a column 28. An absorber 34 is placed on top of the layer 32. Radiation 52 that impinges onto the absorber 34 is converted to thermal energy. As the intensity of the radiation 52 onto the absorber 34 increases the thermal energy produced by the absorber increases. Likewise, as the intensity of the radiation 52 onto the absorber 34 decreases the thermal energy produced by the absorber decreases. The layer 32 detects the level of thermal energy of the absorber 34.

Between the base 74 of the column 28 and the top surface 26 of the substrate 24 there is a thermal shunt 72. As described in relation to FIG. 7, the thermal shunt 72 may be controllably operable in different states between conduction and isolation to provide a higher thermal conductance path, i.e. low thermal isolation, or a lower thermal conductance path, i.e. high thermal isolation. Operation of the thermal shunt 72 can be used to periodically "reset" the detectors to a desired bias level.

For example, during an initial operation the thermal shunt 72 may be in a high thermal conductance state and thereby provide low thermal isolation between the substrate 24 and the column 28. In this state, the column 28 and detector 31 will reach thermal equilibrium with the substrate 24. As explained further below, the substrate 24 can be controlled to be at a desired temperature. In this manner the detector 31 can be biased to a desired temperature. For example, if the radiation sensitive layer 32 is TLC it can be biased to a desired operating point, such as temperature of red onset for the particular TLC material. After the detector 31 has been biased to a desired operating point the thermal shunt can be operated to change to a state of low thermal conductance and thereby provide a high thermal isolation between the substrate 24 and the column 28.

While the thermal shunt 72 is in its low thermal conductance it will provide a high thermal isolation between the column and the substrate. With the thermal shunt in this state, any radiation that impinges onto the absorber 34 will be converted to heat. Due to the high thermal isolation between the column 28 and the substrate 24, the heat will remain in the absorber and be sensed by the radiation sensitive layer 32. In this manner the amount of radiation impinging on the absorber 34 can be detected. Due to the high thermal isolation, even when momentarily blocking the impinging radiation, the absorber will remain at an elevated temperature and be sensed by the layer 32. It may be desirable to periodically "reset" the detector 31 to the predetermined bias operating point. To "reset" the detector 31, the thermal shunt 72 can be operated to change states so that there is a high thermal conductance path, providing low thermal isolation, between the column 28 and the substrate 24 so that the column 28 and detector 31 return to thermal equilibrium with the substrate. In this manner, the focal plane array 16 can be periodically reset to a predetermined operating point.

In another embodiment the relative positions of the radiation sensitive layer 32 and absorbers 34 may be changed, as illustrated in FIG. 4. In addition, in other embodiments the thermal shunt 72 may be located in other positions relative to the substrate 24, radiation sensitive layer 32, and absorber 34. For example, the thermal shunt 72 may by located between the top surface 30 of the column 28 and the detector 31. In another example, the thermal shunt may be located on top of the focal plane array, or between the focal plane array and the entrance pupil of the detection system, such as within the collection optics 14, to prevent radiation from impinging onto the focal plane array.

Figure 9:
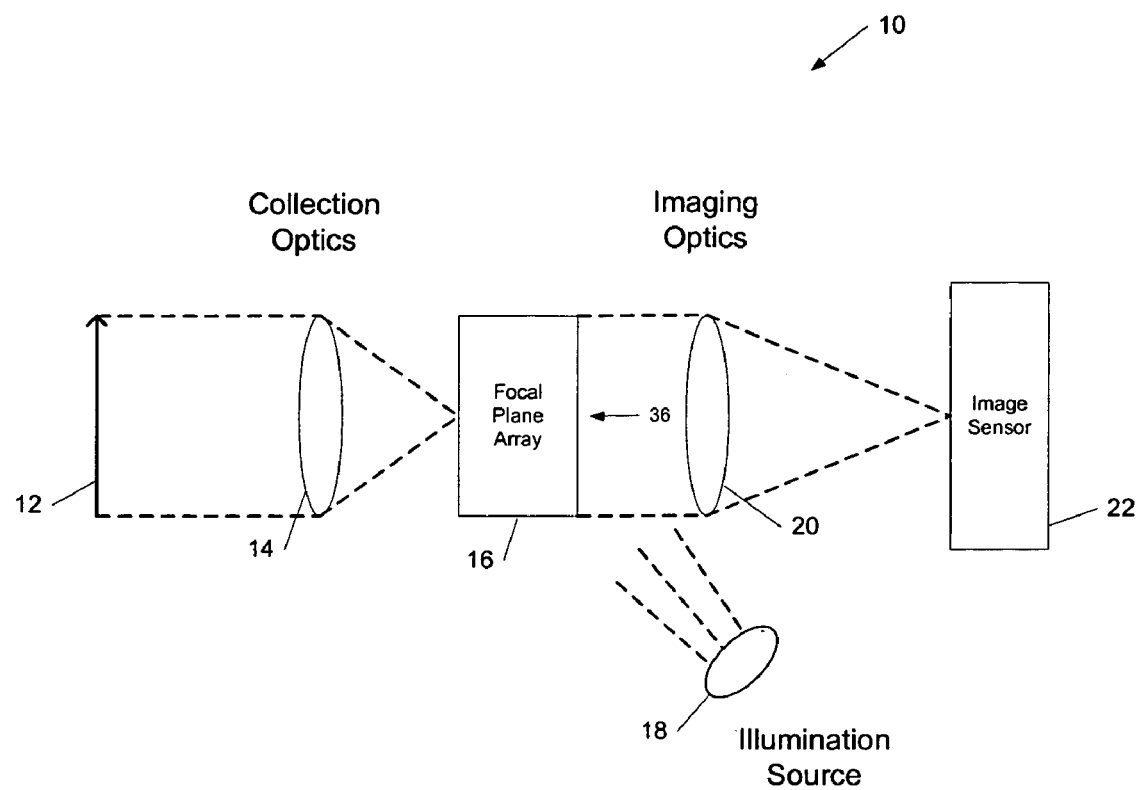
FIG. 9 is a schematic diagram illustrating an exemplary arrangement of components of a radiation detector constructed in accordance with the invention.

FIG. 9 is a schematic diagram illustrating an exemplary arrangement of components of a radiation detector system 10. In the example of FIG. 9, the focal plane array is configured as described in relation to FIG. 3, where the radiation sensitive layer 32 is disposed upon the top of the column and the absorber 34 is disposed on top of the layer 32. In addition, the focal plane array 16 substrate and support columns are optically transparent. With the focal plane array configured in this manner the sensing element may be viewed from the "back" 36 of the focal plane array.

Thus, in FIG. 9, an image of an object 12 is focused onto the focal plane array 16 by the collection optics 14. The focal plane array 16 is illuminated by illumination source 18. An image of the focal plane array 16 detectors is focused onto an image sensor element 22 by imaging optics 20.

Figure 10:
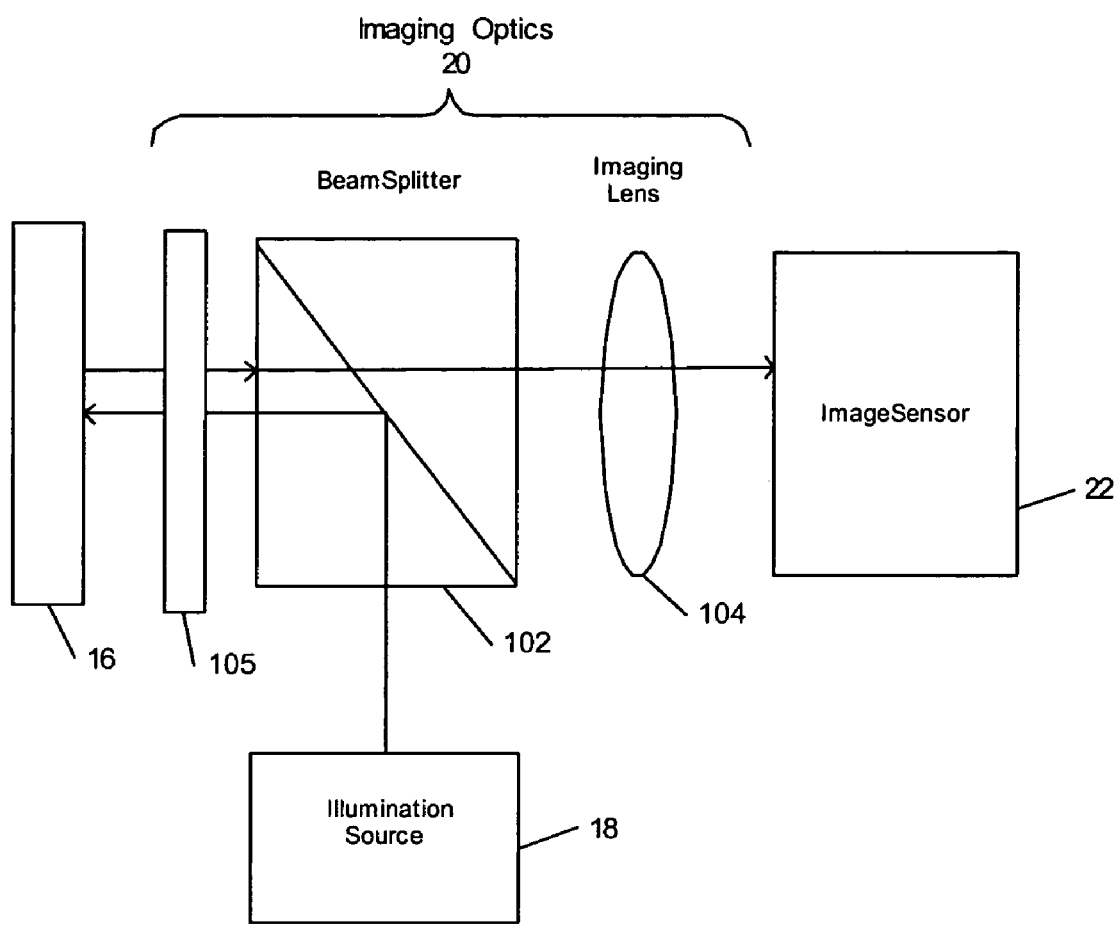
FIG. 10 is a schematic diagram illustrating additional detail of an exemplary arrangement of imaging components that may be used in a radiation detector constructed in accordance with the invention.

FIG. 10 is a schematic diagram illustrating additional detail of an exemplary arrangement of imaging components that may be used in a radiation detector. As shown in FIG. 10, imaging optics 20 includes a beam splitter 102 and an imaging lens 104. The output of illumination source 18 is reflected in the beam splitter 102 and directed to illuminate the back of the focal plane array 16. In the path between the illumination source 18 and the focal plane array 16 may be placed an optional filter 105. The filter 105 may be configured to block radiation emitted from the illumination source that the detectors within the focal plane array would sense, while passing other radiation. For example, if the detectors are sensitive to heat, the filter 105 may be configured to block infrared radiation but pass other radiation. In one embodiment, the filter 105 may be constructed of glass which blocks infrared radiation so as to minimize any disturbance, or influence, of the illumination source upon the focal plane array detectors while still allowing the focal plane array to be imaged through the filter 21. The illumination source 18 may be a broad or a narrow spectral output. In addition, the illumination source may be tunable. In one embodiment, the illumination source 18 may be made of one or more narrow band sources so as to be able to enhance specific response ranges of the detectors. That is, the illumination source may have one or more narrow band sources, such as narrow band LEDs, that output a spectrum matched to a specific spectral range of interest.

An image of the detectors of the focal plane array 16 passes through the filter 105 and the beam splitter 102 and is focused onto the image sensor 22 by the imaging lens 104.

Figure 11:
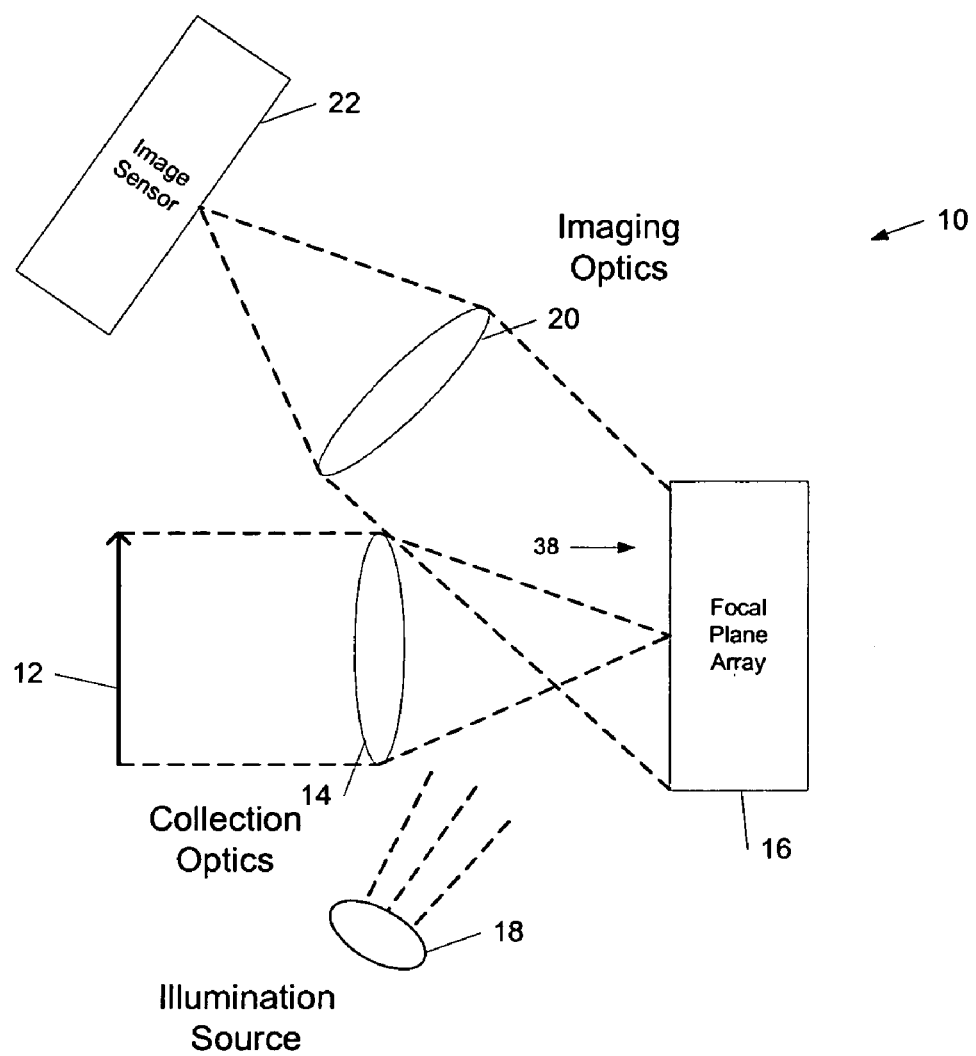
FIG. 11 is a schematic diagram illustrating another exemplary arrangement of components of a radiation detector.

FIG. 11 is a schematic diagram illustrating another exemplary arrangement of components of a radiation detector 10. In the example of FIG. 11, the focal plane array is configured as described in relation to FIG. 4, where the absorber 34 is disposed upon the top of the column and the radiation sensitive layer 32 is disposed on top of the absorber 34. With the focal plane array configured in this manner the sensing element may be viewed from the "front" 38 of the focal plane array.

Thus, in FIG. 11, an image of an object 12 is focused onto the focal plane array 16 by the collection optics 14. The front of the focal plane array 16 is illuminated by the illumination source 18. An image of the focal plane array 16 detectors is focused onto a sensor element 22 by imaging optics 20. In this configuration, because the detectors of the focal plane array 16 are directly viewed, rather than viewing the detectors "through" the focal plane array substrate, the substrate and columns of the focal plane array may be constructed of non-transparent material. An optional filter, not shown, may be placed between illumination source 18 and the focal plane array 16. The filter may be configured to block radiation emitted from the illumination source that the detectors within the focal plane array would sense, while passing other radiation.

Figure 12:
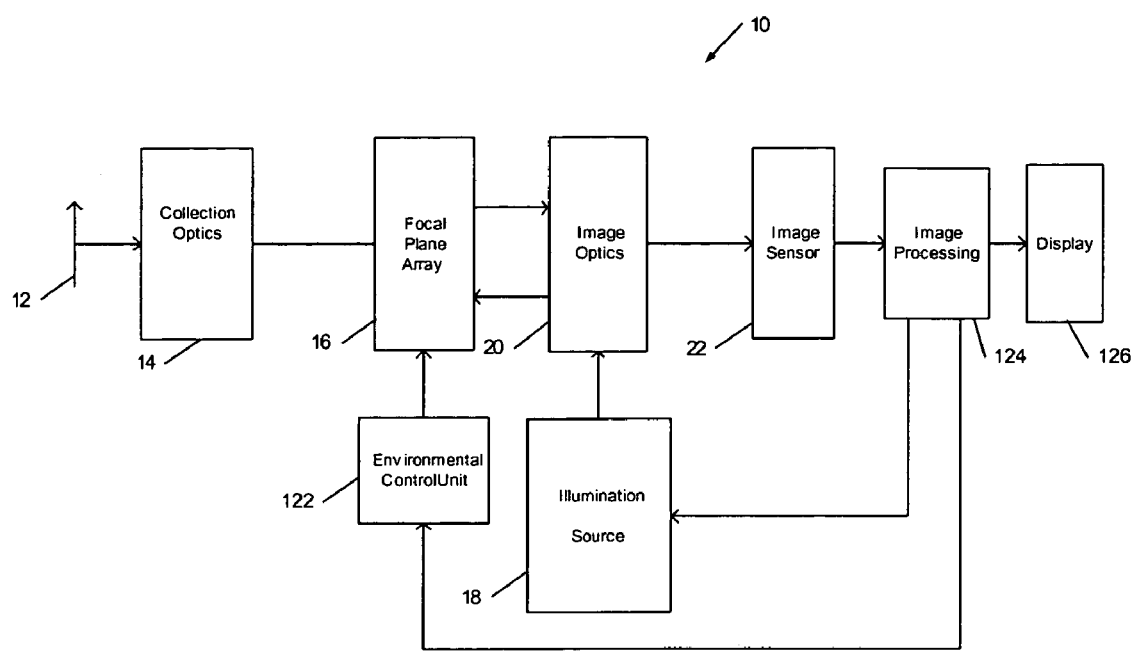
FIG. 12 is a block diagram of another embodiment of a radiation detection system in accordance with the invention.

FIG. 12 is a block diagram of another embodiment of a radiation detection system 10. The block diagram of FIG. 12 is similar to FIG. 1 in that an image of an object 12 is focused onto the focal plane array 16 by collection optics 14. An illumination source 18 illuminates the focal plane array 16 and an image of the focal plane array detectors is focused onto image sensor 22 by imaging optics 20. FIG. 12 also includes an environmental control unit 122. In one embodiment, the environmental control unit 122 may control the temperature of the substrate to bias the focal plane array 16 to a desired operating point. In another embodiment, the environmental control unit 122 may evacuate the region around the focal plane array 16 to create a deep vacuum. In other embodiments, other environmental features may be controlled, for example, controlling both temperature and vacuum, and controlling humidity or any other combination of environmental aspects including magnetic field and electrical field environment.

The example of FIG. 12 also includes an image processor 124 and a display 126. Image processing techniques are well known in the art and may be used to enhance the visual display presented on the display 126. For example, it may be desirable to re-map the color thermal output originating in the focal plane array 16 to conform the output to generally accepted color maps for features such as hue, saturation, and intensity (HSI). It may also be desirable to re-map the color thermal output for contrast enhancement, red-green-blue (RGB) analysis, geometric distortion correction, etc.

The image processor 124 may be configured to control the illumination source. The image processor may also be configured to control the environmental control unit 122. For example, the image processor 124 may control the environmental control unit 122 so as to bias the focal plane array to a desired operating point.

Figure 13:
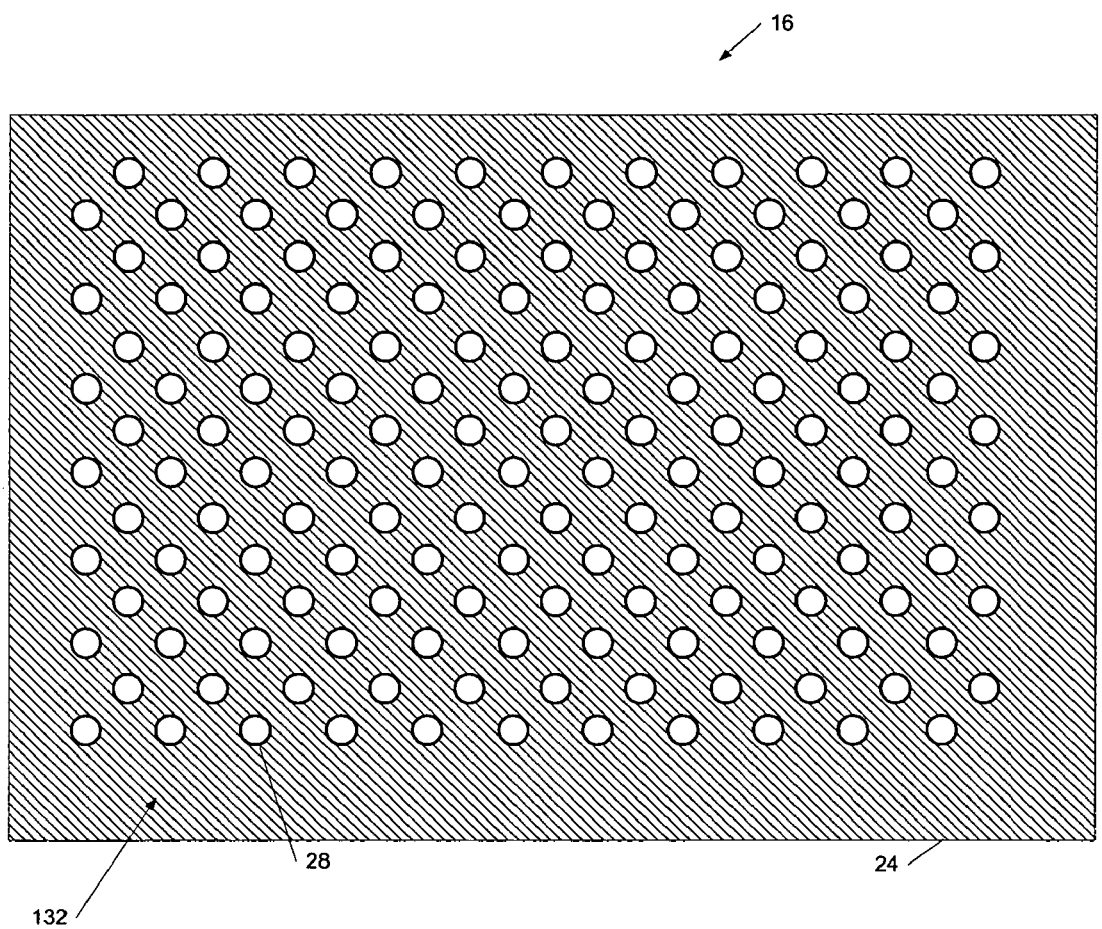
FIG. 13 is a schematic diagram illustrating an exemplary design of a focal plane array.

FIG. 13 is a schematic diagram illustrating a plan view of an exemplary design of a focal plane array 16. As shown in FIG. 13, the focal plane array 16 includes a substrate 24 and an array 132 of support columns 28. In the example of FIG. 13, the support columns 28 have a circular cross section. As described above, detectors may be disposed upon the tops of the support columns 28 in various configurations.

Figure 14:
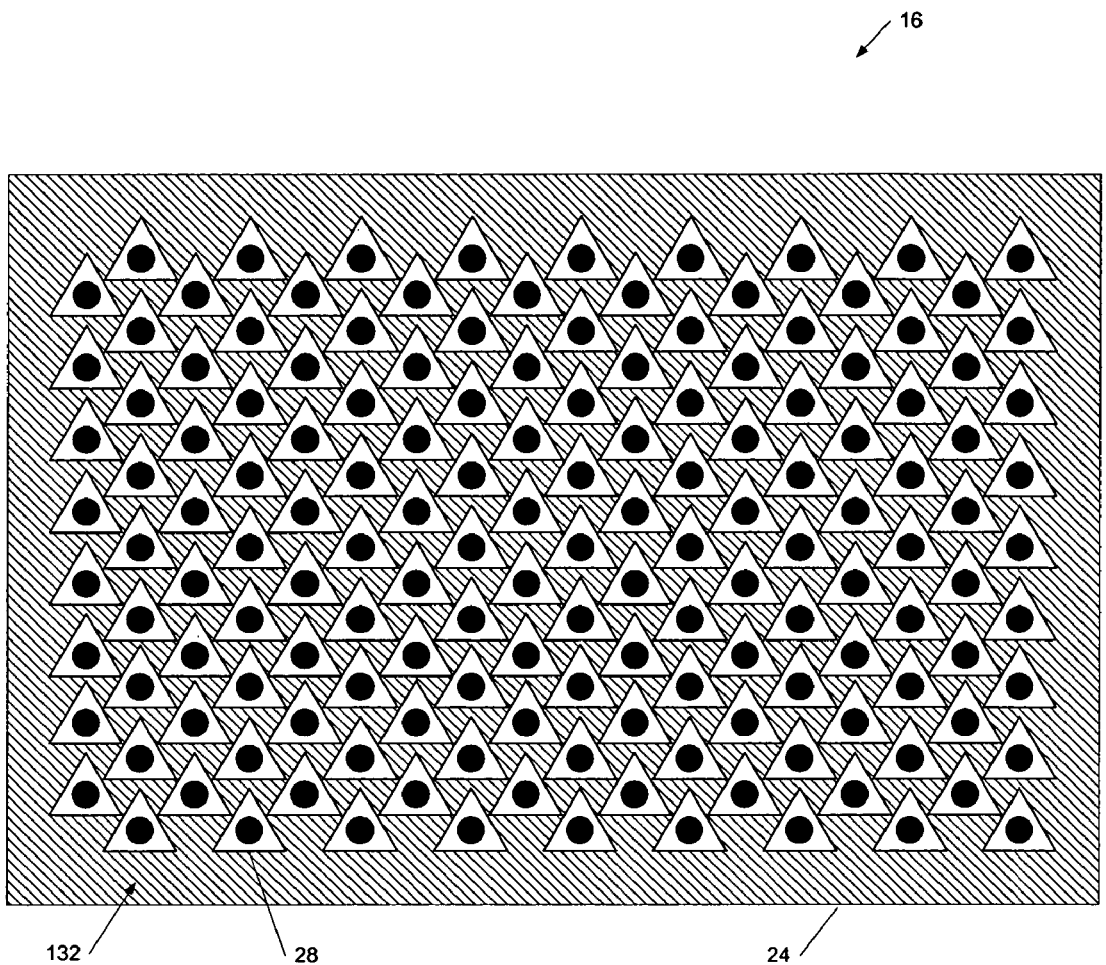
FIG. 14 is a schematic diagram illustrating another exemplary design of a focal plane array.

FIG. 14 is a schematic diagram illustrating a plan view of another exemplary design of a focal plane array 16. As shown in FIG. 14, the focal plane array 16 includes a substrate 24 and an array 132 of support columns 28. In the example of FIG. 14, the support columns 28 have a triangular cross section. As described above, detectors may be disposed upon the tops of the support columns 28 in various configurations. An aspect to the triangular cross section of the support columns is that each side of one of the triangular cross sectional columns is directed toward, or facing, an apex, or point, of an adjacent column. In this manner isolation between adjacent columns may be increased by minimizing the surface areas exposed to adjacent support columns.

Figure 15:
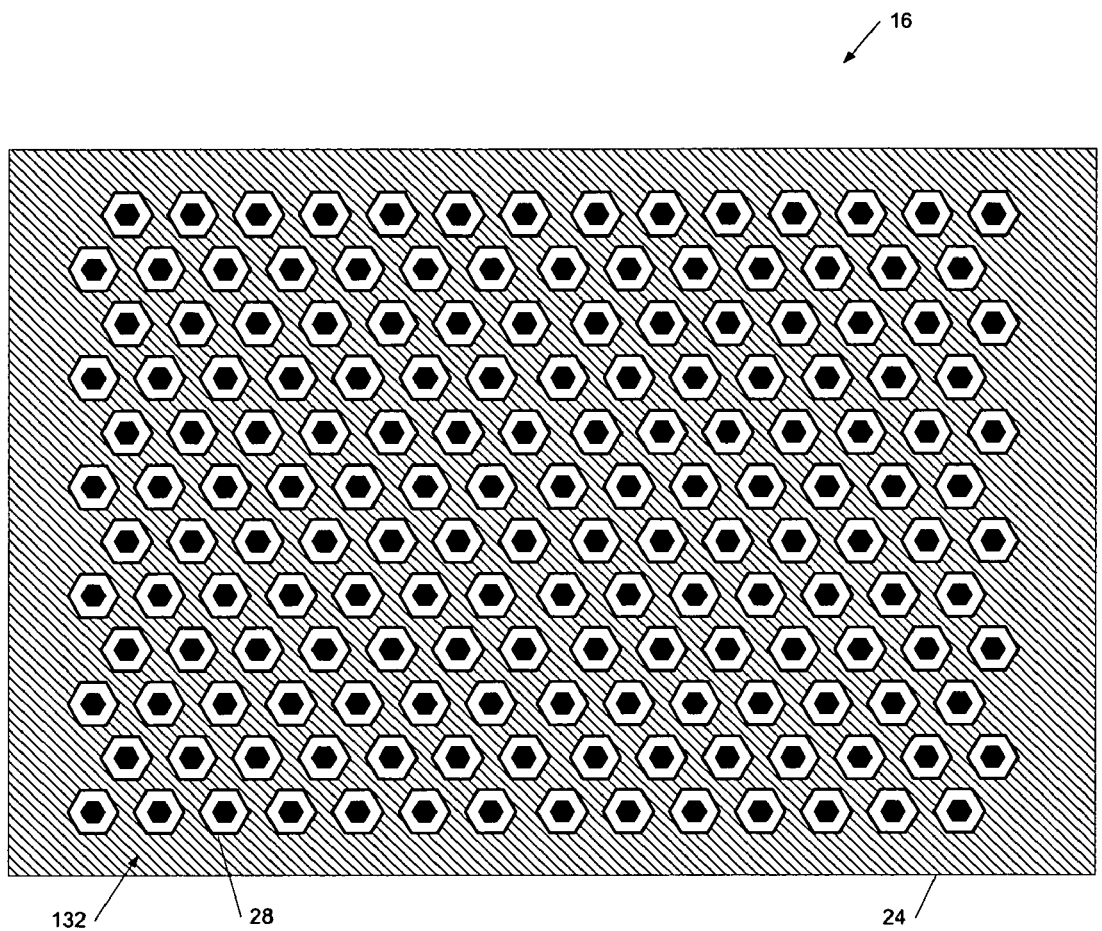
FIG. 15 is a schematic diagram illustrating yet another exemplary design of a focal plane array.

FIG. 15 is a schematic diagram illustrating yet another exemplary design of a focal plane array 16. As shown in FIG. 15, the focal plane array 16 includes a substrate 24 and an array 132 of support columns 28. In the example of FIG. 15, the support columns 28 have a hexagonal cross section. As described above, detectors may be disposed upon the tops of the support columns 28 in various configurations.

Figure 16:
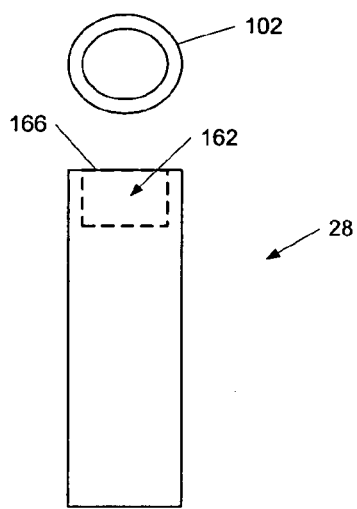
FIG. 16A is a schematic diagram of a support column with a circular cross section.
FIG. 16B is a schematic diagram of another support column with a circular cross section.
FIG. 16C is a schematic diagram of yet another support column.
FIG. 16D is a schematic diagram of still another embodiment of a support column.
Figure 16:
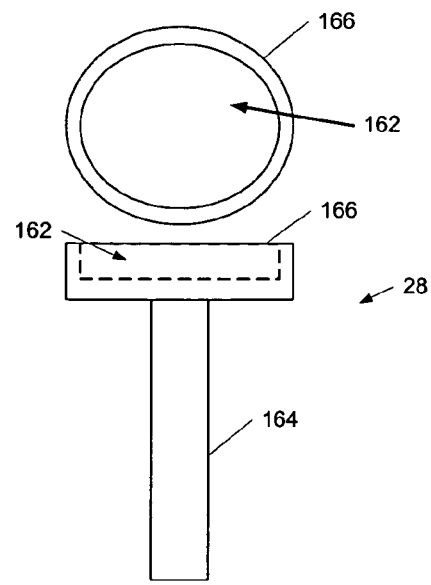
Figure 16:
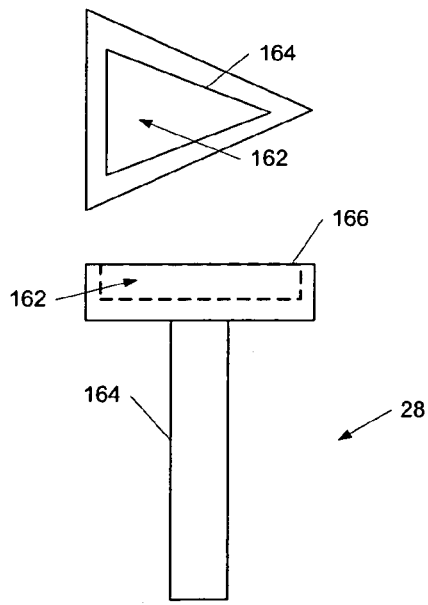
Figure 16:
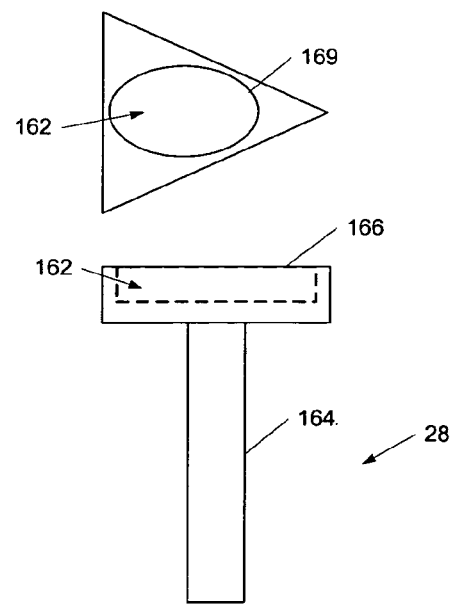

As illustrated by FIGS. 13–15, the focal plane arrays can include support columns constructed in many different shapes. FIG. 16 (comprising 16A, 16B, 16C, and 16D) includes four different examples of detector support column shapes.

FIG. 16A is a schematic diagram of a support column 28 with a circular cross section. As shown in FIG. 16A, the support column 28 is a cylindrical column with a circular cross section. In one embodiment, a radiation sensitive layer or absorber may be disposed onto the top surface 166 of the column 28. In another embodiment, there may be an optional recessed cavity 162 (indicated by dashed lines) in the top of the column 28 where a radiation sensitive layer, an absorber (such as a thermal conversion material), or both may be disposed. The recess 162 can provide further insulation between adjacent columns to reduce lateral dispersion of incident energy.

FIG. 16B is a schematic diagram of another support column 28 with a circular cross section. As shown in FIG. 16B, the support column 28 has a cylindrical base column 164 with an extended circular cross section top 166 that has a larger diameter than the cylindrical base column 164. The cylindrical base column can be constructed as a solid, or as a hollow structure. In one embodiment, a radiation sensitive layer or absorber may be disposed onto the top surface 166 of the column 28. In another alternative, a recessed cavity 162 (indicated by dashed lines) is located in the top surface 166 of the column 28, where the radiation sensitive layer, absorber, or both may be disposed. As noted above, in the discussion of FIG. 5, the support column illustrated in FIG. 16B may increase the active area of the focal plane array while also increasing the isolation between adjacent detectors. As noted, the isolation can be improved by the recess cavity 162 in the columns.

FIG. 16C is a schematic diagram of yet another support column 28. As shown in FIG. 16C, the support column 28 may have a cylindrical base column 164. In other embodiments, the base column may have solid, hollow, or structural aspects. The base column 164 can have other cross sectional shapes, for example, oval, or multisided polygons such as triangles, squares, rectangles, pentagons, hexagons, etc. Similarly, the column construction may be constructed to have top surfaces of such varied shapes and configurations, including circular, oval, or multisided polygons. In the example of FIG. 16C, the top surface 166 of the support column 28 has a triangular cross section. In one embodiment, a radiation sensitive layer or absorber may be disposed onto the top surface 166 of the column 28. In another embodiment, there may be a recessed cavity 162 (indicated by dashed lines) in the top surface 166 of the column 28 where the radiation sensitive layer, absorber, or both may be disposed.

In the examples shown in FIGS. 16A–16C, the recess 162 was the same cross sectional shape as the corresponding support column 28 (in FIG. 16A), or the top surface 166 (in FIG. 16B and FIG. 16C). In other embodiments, the recess 162 may be a different shape than the corresponding top surface of the column. FIG. 16D is still another embodiment of a support column 28, this one having different recess and top surface shapes. FIG. 16D is similar to FIG. 16C, where the support column 28 has a cylindrical base column 164 and the top surface 166 of the support column 28 has a triangular cross section. In FIG. 16D, however, the recess 162 is not the same cross section as the top surface 166. As shown in FIG. 16D, even though the top surface 166 is one cross sectional shape, a triangle, the recess 162 may be a different cross sectional shape, for example an oval, as shown in FIG. 16D, or the recess may be any other desired shape.

In the examples illustrated in FIGS. 16A–16D the base support column was described as having a circular cross section. Other cross sections of the base support columns are possible. For example, the base support column may be oval, or any polygon shape.

Figure 17:
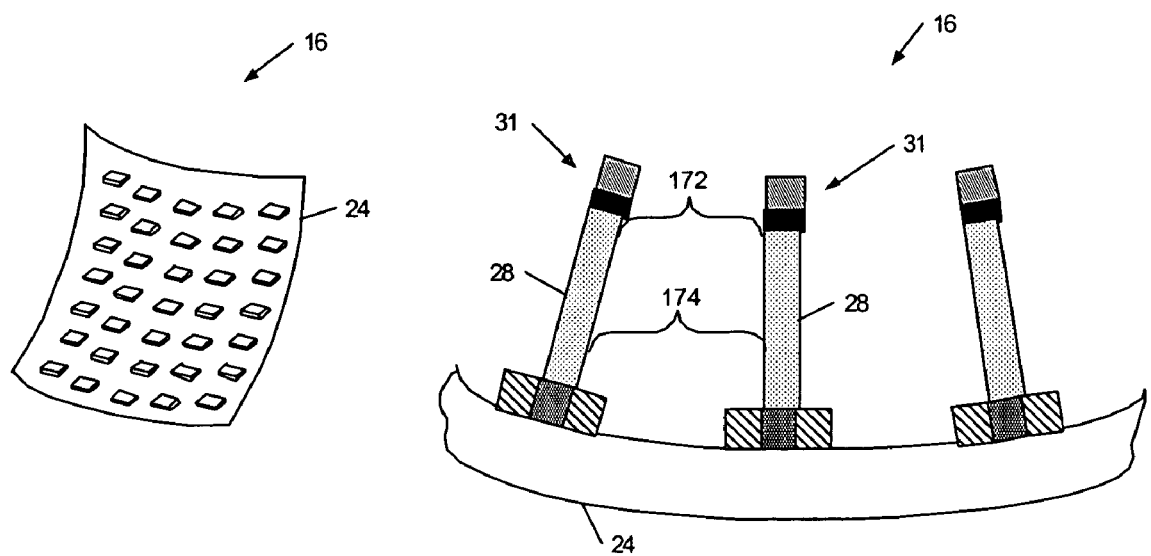
FIG. 17 is an schematic diagram of an embodiment of a non-planar focal plane array.

FIG. 17 is a schematic diagram of an embodiment of a non-planar focal plane array 16. In the embodiment of FIG. 17, the substrate of the focal plane array 16 may be made of a pliable material such as polyester. If the substrate 24 material is pliable, the focal plane array can be formed to shapes other than flat surface shapes. Likewise, the substrate of the focal plane array 16 can be formed to a non-planar shape even if the substrate is a non-pliable material. For example, as illustrated in FIG. 17, the focal plane array 16 is formed into a concave shape. The concave shaped focal plane array can be constructed using a non-pliable material that has been "shaped" into a concave form, or it can be constructed using a pliable material that is "formed" into a concave form. A concave shape of the focal plane array 16 may be desired in some applications. For example in a reflective system, such as illustrated in FIG. 11, it may be beneficial to have a concave shaped focal plane array 16. Also, if the object emitting the radiation is small in size, such as in microscopy applications, then it may be possible to improve the resolution, and detail, of the mapping of the radiation.

An additional aspect of making the focal plane array a concave shape is that the separation 172 between the detectors 31 is decreased, thereby increasing spatial resolution of the focal plane array. In addition, the separation 174 of the support columns 28 is increased, thereby improving isolation between adjacent columns 28.

Figure 18:
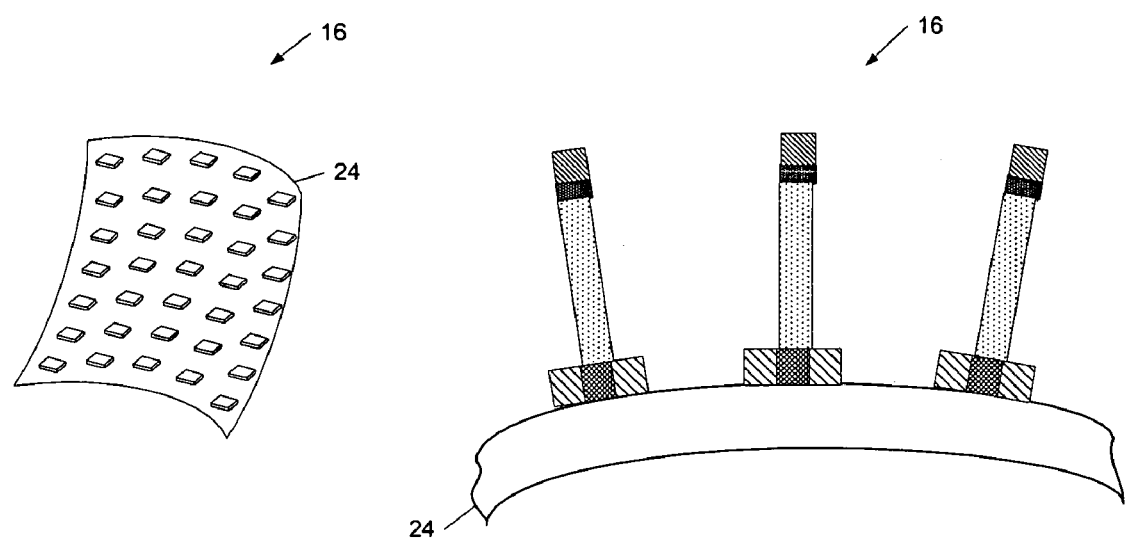
FIG. 18 is an schematic diagram of another embodiment of a non-planar focal plane array.

FIG. 18 is a schematic diagram of another embodiment of a non-planar focal plane array 16. In the embodiment of FIG. 18, the substrate of the focal plane array 16 may be made of a pliable material such as polyester. If the substrate 24 material is pliable, the focal plane array can be formed to shapes other than flat surface shapes. Likewise, the substrate of the focal plane array 16 can be formed to a non-planar shape even if the substrate is a non-pliable material. For example, as illustrated in FIG. 18, the focal plane array 16 is formed into a convex shape. The convex shaped focal plane array can be constructed using a non-pliable material that has been "shaped" into a convex form, or it can be constructed using a pliable material that is "formed" into a convex form. A convex focal plane array 16 may be desired in some applications, such as, in the scenario where an object emitting radiation is large in size relative to the focal plane array. A convex focal plane array 16 may also be desirable, for example, if a "fish-eye" lens is used in the collection optics.

Figure 19:
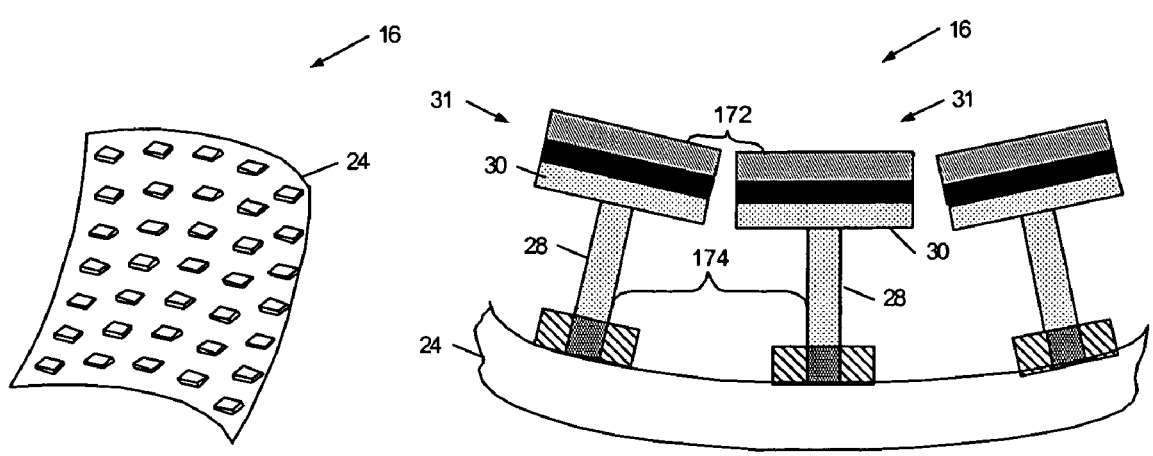
FIG. 19 is an schematic diagram of an yet another embodiment of a non-planar focal plane array.

FIG. 19 is a schematic diagram of an yet another embodiment of a non-planar focal plane array 16. The support columns of the focal plane array 16 in FIG. 19 have an enlarged top surface 30. Again, the focal plane array can be "shaped" or "formed" to shapes other that flat surface shapes. For example, the focal plane array 16 in FIG. 19 has a concave shape. Again, making the focal plane array a concave shape the separation 172 between the detectors 31 is decreased, thereby increasing special resolution of the focal plane array. In addition, the separation 174 of the support columns 28 is increased, thereby improving isolation between adjacent columns 28.

Figure 20:
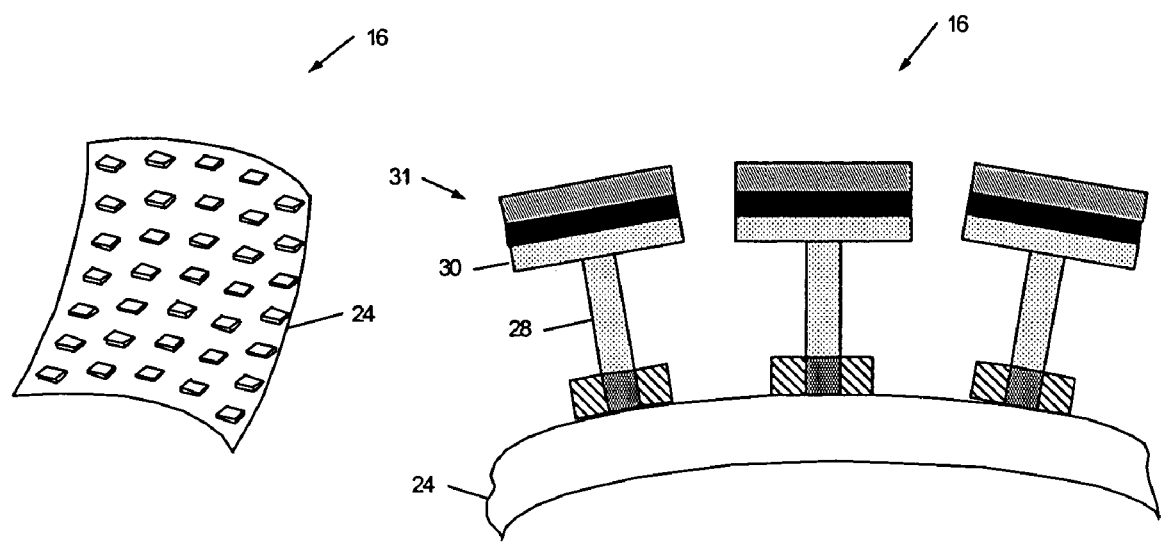
FIG. 20 is an schematic diagram of still another embodiment of a non-planar focal plane array.

FIG. 20 is a schematic diagram of still another embodiment of a non-planar focal plane array 16. The support columns of the focal plane array 16 in FIG. 20 have an enlarged top surface 30. The focal plane array can be "shaped" or "formed" to shapes other that flat surface shapes. For example, the focal plane array 16 in FIG. 20 may formed into a convex shape.

The shapes of the focal plane array illustrated in FIGS. 17–20 are merely examples. The focal plane array can be "shaped" or "formed" into other shapes, for example, hyperbolic, circular, spherical, etc. In other words, the shape of the focal plane array can be selected as desired for use in a particular application. The ability to have a focal plane array of different shapes can reduce, or eliminate, the need for expensive optics needed to focus an image onto a planar focal plane array. In addition, the focal plane array may be constructed in a large format, for example, in a health care application it may be desirable to construct a focal plane array that is large enough to image an area of interest, such as a human face. Constructing a focal plane array in a large format may allow the focal plane array to be directly viewed without the need for an imaging sensor or imaging optics.

Figure 21:
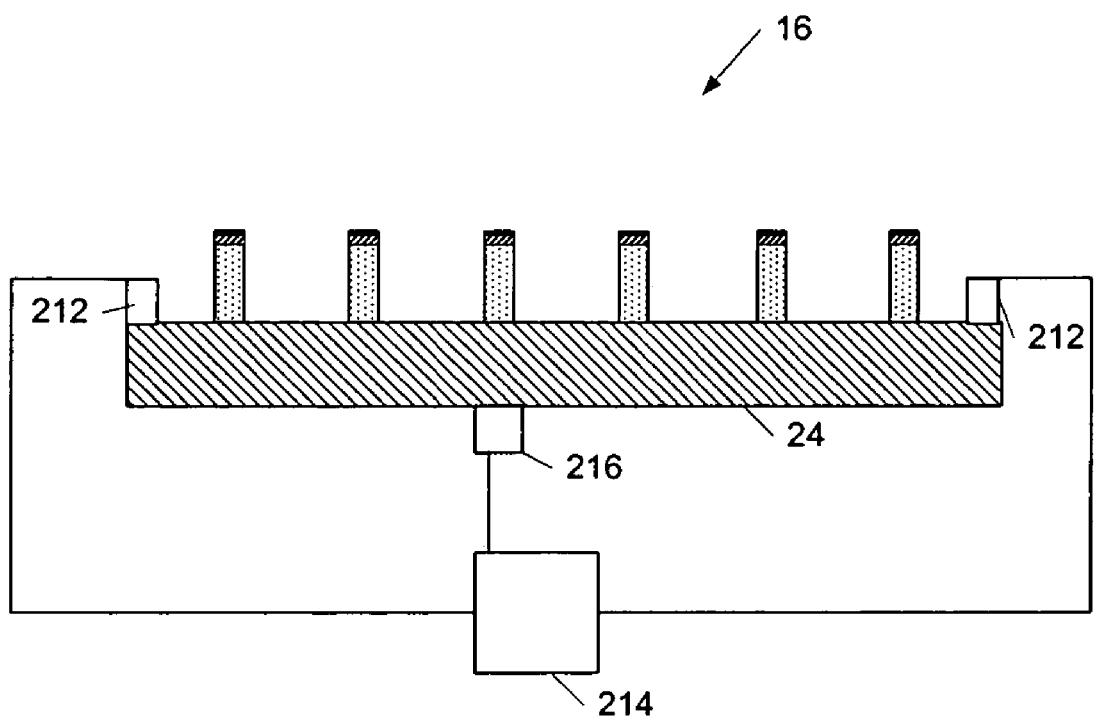
FIG. 21 is a block diagram of an embodiment of an environmental control unit.

FIG. 21 is a block diagram of an embodiment of an environmental control unit. As shown in FIG. 21, temperature elements 212 are in thermal connection with the substrate 24 of a focal plane array 16. A controller 214 is connected to the temperature element 212 so as to adjust the temperature of the temperature element 212. As the temperature of the temperature element 122 varies the temperature of the focal plane array 16 substrate 24 varies accordingly. In this way the focal plane array substrate 24 can be set to a desired temperature. Also, in thermal connection with the substrate 24 is a temperature sensor 216 that detects the substrate 24 temperature. The thermal sensor 216 is in communication with the controller 214 thereby providing the substrate 24 temperature for use by the controller 214 in controlling the temperature elements 212. As described above, control of the substrate temperature can be used to bias some detectors, such as TLC, to desired operating points, such as red onset, or some other point in their operating range.

The temperature element 212 may be any type of heating or cooling apparatus that can be controlled. For example, the temperature element 212 may be a thermoelectric cooler, an electric heating element, or other device capable of controlling temperature. The embodiment of FIG. 21 describes controlling the temperature of the substrate. Other embodiments of an environmental control unit may control other environmental characteristics. For example, the environmental control unit may operate to maintain a desired temperature, or vacuum, or humidity level or control any combination of environmental characteristics including magnetic field and electric field environments.

Figure 22:
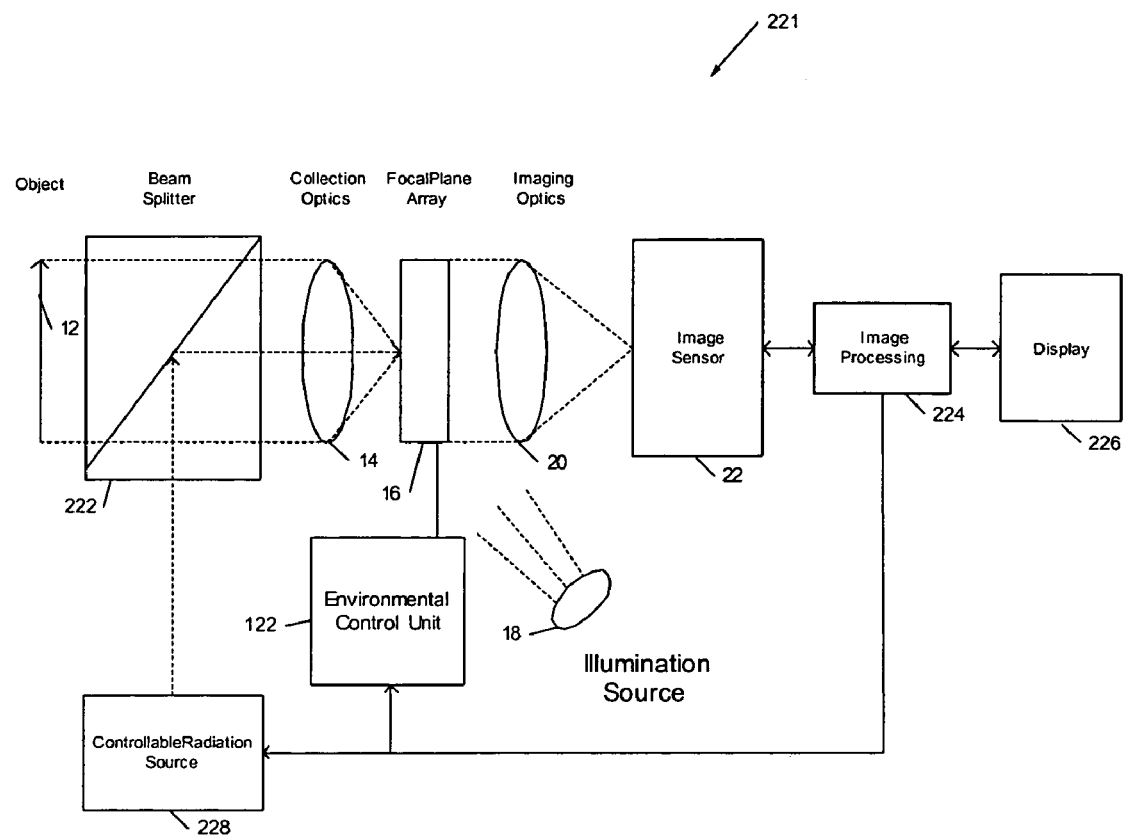
FIG. 22 is a block diagram of a null sensor arrangement.

FIG. 22 is a block diagram of a null sensor 221 arrangement. As shown in FIG. 22, an image of an object 12 passes through a beam splitter 222 and is focused onto a focal plane array 16 by collection optics 14. The focal plane array 16 is illuminated by illumination source 18. An image of the detectors of the focal plane array 16 is focused onto image sensor 22 by imaging optics 20. The output of the image sensor 22 is input to an image processor 224. The output of the image processor may be presented on a display 226. The image processor 224 is also in communication with a controllable radiation source 228 and an environmental control unit 122 controlling a bias operating point of the focal plane array.

In one embodiment, the focal plane array 16 includes sensing elements, such as TLC. The environmental control unit may be controlled by the image processor 224 to establish a desired bias, or operating point for the focal plane array 16. For example, the environmental control unit 122 may establish a bias point for TLC detectors included on the focal plane array so that the TLC detectors are at red onset. Thus, with no radiation impinging upon the focal plane array, the entire array of sensing elements would be biased to red onset. The elimination of radiation impinging onto the focal plane array may be accomplished in many ways, for example, placing a shutter over the entrance pupil of the null sensor 221, or have thermal shunts located so as to block radiation from impinging on the focal plane array as described above.

After the focal plane array 16 has reached its bias operating point, the controllable radiation source 228 may be commanded to output radiation that is reflected off of the beam splitter 222 so as to impinge upon the focal plane array 16. The radiation from the controllable radiation source 228 that impinges the focal plane array 16 is controlled so as to set the detectors in the focal plane array to a known, desired, operating point. For example, if the detectors include TLC, the controllable radiation source may be commanded by the image processor 224 to input radiation sufficient to set the detectors in the focal plane array to green, or other desired, operating point. It is noted that the controller radiation source 228 may include a scanning mechanism to scan the radiation source output across the focal plane array 16. In other embodiments the scanning mechanism may be separate from the controllable radiation source 228.

During operation of the null sensor 221, as radiation from the object 12 impinges on the focal plane array the detectors that include TLC color will change accordingly. The change in color will be detected at the image sensor 22. The output of the image sensor 22 is connected to the image processor 224 that generates commands to the controllable radiation source to increase or decrease the output of the controllable radiation source as it scans across the focal plane array so that the TLC color remains at its desired operating color, for example green. The signal for controlling the controllable radiation source 228 corresponds to the radiation received from the object 12. The image processor 224 may generate an image corresponding to the control signal and generate a display be presented on the display 226.

The description of FIG. 22 was of an embodiment when the "back" of the focal plane array 16 is imaged. In another embodiment, rearrangement of components within the null sensor 221 can support imaging of the "front" of the focal plane array 16.

The controllable radiation source 228 may also be used to output a known radiation directed to the focal plane array to characterize, or calibrate, the sensitivity and response of detectors with the focal plane array. For example, the controllable radiation source 228 may be controlled so as to expose the focal plane array 16 to a constant radiation level, a step change in radiation level, a gradient radiation level, or other variable radiation level. In addition, a target with a known radiation profile may be exposed to the focal plane array 16. For example a target "shutter" may be placed in front of, or in the entrance pupil of, the radiation detector system and thereby be exposed to the focal plane array. The performance of the detectors within the focal plane array when exposed to a known radiation can be evaluated. For example, the performance characteristics of the detectors, such as sensitivity and response to a step, or varying radiation input can be evaluated.

Figure 23:
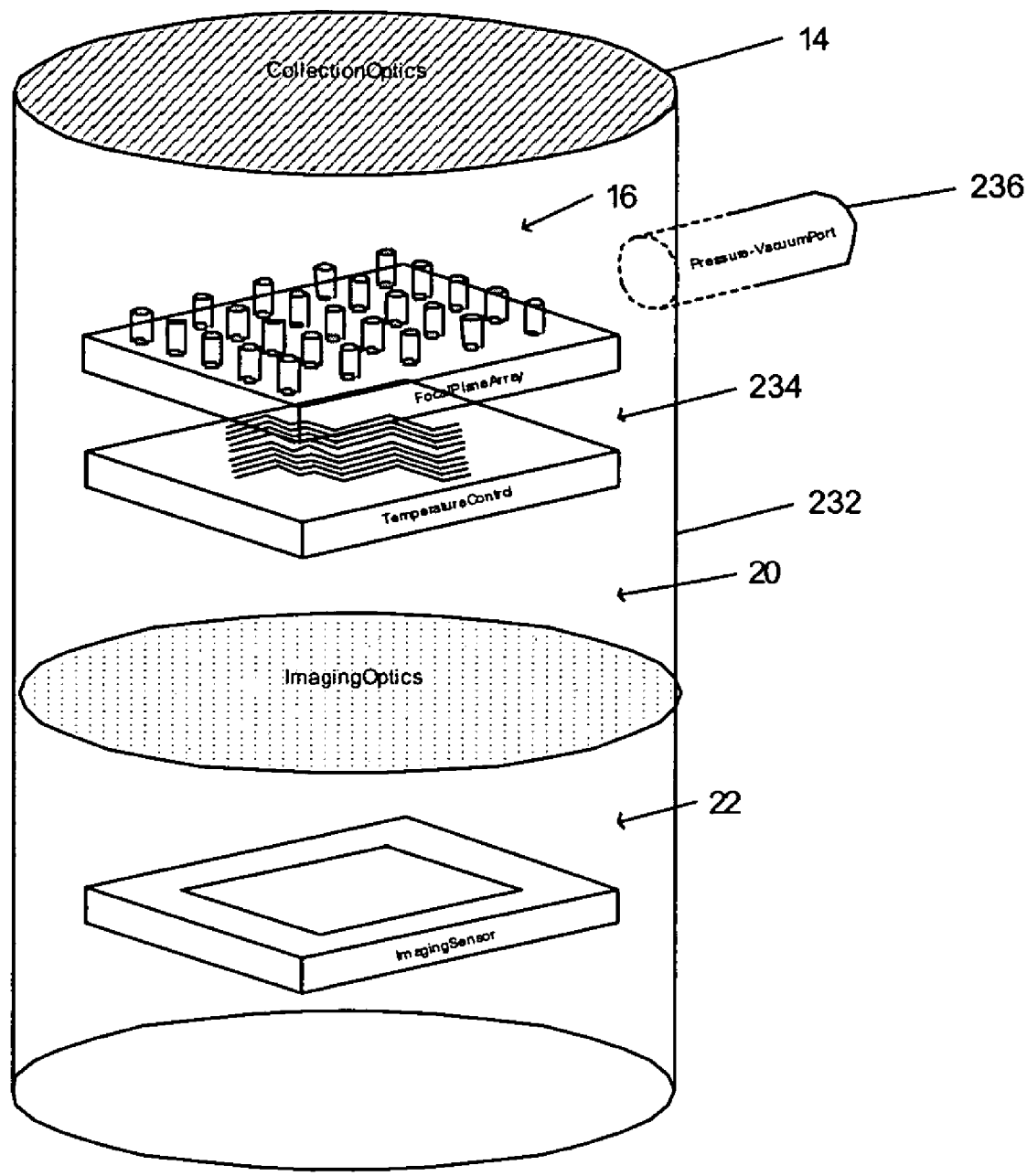
FIG. 23 is a block diagram of another embodiment of a radiation detector system.

FIG. 23 is a block diagram of another embodiment of a radiation detector system. As shown in FIG. 23 the radiation detection system includes a pressure vessel 232. One end of the pressure vessel 232 allows radiation to enter the vessel. For example, one end of the pressure vessel 232 may be formed by at least a portion of the collection optics 14 that includes a glass plate, or lens, that forms the end of the pressure vessel. Inside the pressure vessel is a focal plane array 16. Also located in the pressure vessel is a temperature control unit 234. For example, the temperature control unit 234 may be constructed so as to be in contact with the back of the focal plane array 16. As described above, the temperature control unit may be used to bias the focal plane array to a desired operating temperature.

In the example shown in FIG. 23, also located in the pressure vessel are imaging optics 20 and an imaging sensor 22. The imaging optics 20 focus an image of the focal plane array onto the imaging sensor. In another embodiment, at least a portion of the imaging optics 20 includes a glass plate, or lens, that forms another end of the pressure vessel 232. In this way, the imaging sensor 22, as well as additional optics, may be located external to the pressure vessel 232. Penetrating the pressure vessel 232 is a pressure/vacuum port 236. The pressure/vacuum port allows the pressure vessel 232 to be pressurized, or to have a vacuum drawn within the pressure vessel.

Figure 24:
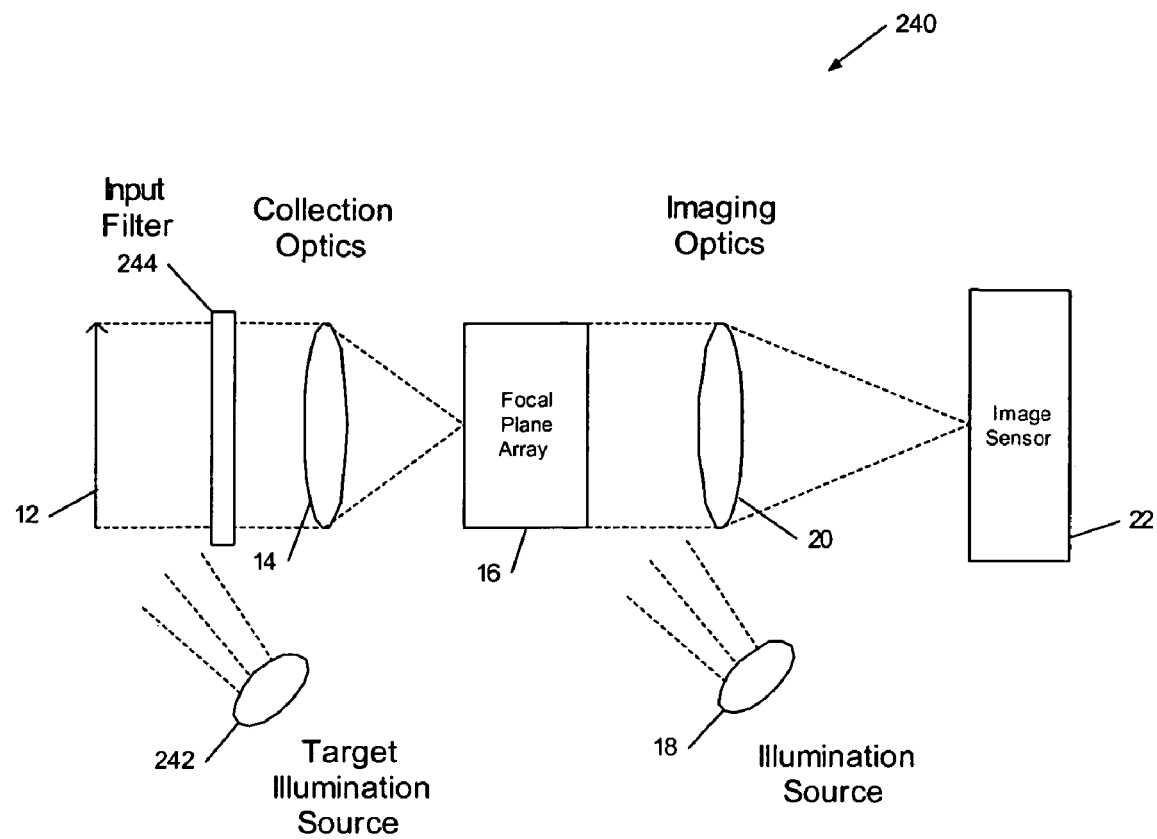
FIG. 24 is a schematic diagram illustrating another embodiment of a radiation detection system.

FIG. 24 is a schematic illustrating another embodiment of a radiation detection system 240. The radiation detection system 240 in FIG. 24 is similar to the radiation detection system 10 illustrated in FIG. 9 and includes an object 12, collection optics 14, focal plane array 16, illumination source 18, imaging optics 20 and imaging sensor 22. The radiation detection system 240 illustrated in FIG. 24 includes a target illumination source. The target illumination source 242 illuminates, or "paints", the object 12. Radiation reflected from the object 12 is then collected by collection optics and focused onto the focal plane array. The target illumination source 242 may be tunable. For example, the target illumination source 242 may include optics or controls to shape the spectrum of the radiation output by the target illumination source 242. In another example, the target illumination source 242 may include multiple sources, each of which outputs a desired spectrum of radiation. In one embodiment, the output of the multiple sources may be mixed, or combined, in any desired combination into a composite source with a desired output spectrum. In another embodiment, the sources may be multiplexed so that only desired ones of the sources, or individual sources, are on at any given moment.

In this manner the object may be painted with radiation of a desired spectral content which may improve the detection of specific objects. For example, if it is desired to identify a particular object, the target illumination source 242 may have its spectral output configured such that radiation that will be reflected from the object of interest will be increased.

The radiation detection system 240 may also include an input filter 244. The input filter may be configured to pass a desired spectrum. For example, the input filter 244 may be configured to have a spectral response, that is pass spectral energy, matched to the spectral output of the target illumination source 242. In another example, the input filter may be configured to have a spectral response that matches a spectral profile of a specific object. The input filter 244 may also be tunable, that is its spectral response may be configurable. In other embodiments, the input filter 244 may include multiple filters that ate individually, or in combination, used to produce the desired spectral response.

Figure 25:
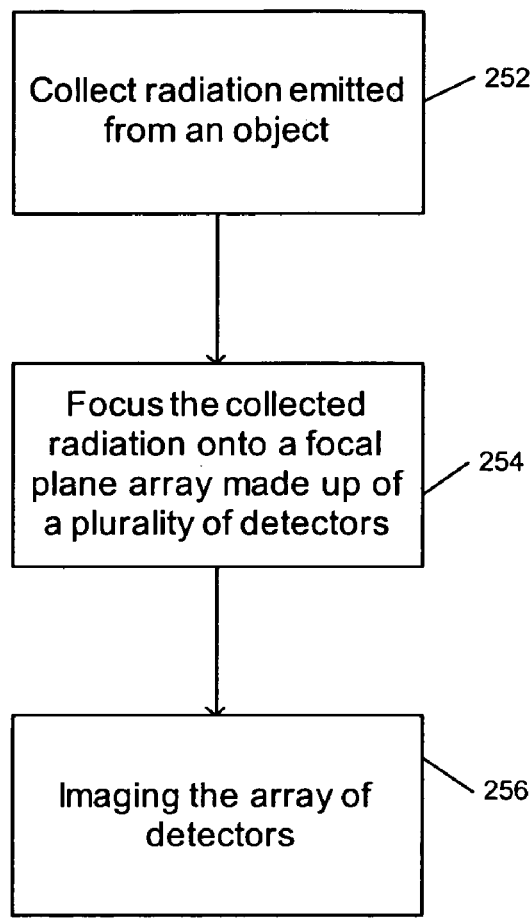
FIG. 25 is a flow chart illustrating detection of radiation from an object.

FIG. 25 is a flow chart illustrating detection of radiation from an object. Flow begins in block 252 where radiation emitted from an object is collected. For example the object may be viewed with collection optics that gather, and form, the radiation in a desired way. In block 254 the collected radiation is focused onto a focal plane array. For example, the collection optics can collect the radiation emitted from an object and focus the radiation onto the focal plane array. The focal plane array may include a plurality of detectors that are formed in an array upon the focal plane array. In block 256 the array of detectors are imaged. For example, an imaging sensor, such as a camera, may produce an image of the array of detectors.

For example, if the detectors include TLC, so that the individual detectors change color in relationship to the amount of radiation that impinges on them, then an image of the detector array can be used to map the radiation that was emitted by the object.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of radiation detection comprising:
receiving radiated energy from an object and directing the radiated energy to a focal plane array;
converting the received energy into thermal energy at the focal plane array; and
imaging the thermal energy to passively produce a color visual thermal energy map of the object at the focal plane array.

2. A radiation detection method as defined in claim 1, further comprising receiving light from the passively produced color visual thermal energy map to produce an enhanced visual image of the map.

3. A radiation detection method as defined in claim 1, wherein converting the received energy comprises converting the received energy into thermal energy with a thermal conversion material having high absorptivity and low emissivity.

4. A radiation detection sensor comprising:
a thermal conversion material that converts incident radiation received from an object into heat energy;
a plurality of mapping elements each of which receives heat energy from the thermal conversion material configured such that the plurality of mapping elements passively produce a color visual thermal map corresponding to the incident radiation; and
an image sensor that receives an image of the color visual thermal map.

5. A radiation detection sensor as defined in claim 4, wherein the mapping elements include thermochromic liquid crystal material.

6. A radiation detection sensor as defined in claim 4, wherein each mapping element comprises a radiation sensitive layer and a thermal conversion material, wherein each mapping element comprises a pixel of the radiation detection sensor and is substantially thermally isolated from other mapping elements.

7. A radiation detection sensor as defined in claim 6, wherein the radiation sensitive layer and thermal conversion material of each mapping element are disposed on a top surface of a column that protrudes from a top surface of a substrate.

8. A radiation detection sensor as defined in claim 7, wherein the substrate that supports the mapping elements is planar.

9. A radiation detection sensor as defined in claim 7, wherein the substrate is constructed of pliable material.

10. A radiation detection sensor as defined in claim 7, wherein the substrate is configured in a non-planar shape.

11. A radiation detection sensor as defined in claim 6, further comprising an environmental control unit.

12. A radiation detection sensor as defined in claim 4, wherein the thermal conversion material has high absorptivity and low emissivity.

13. A radiation detection sensor as defined in claim 4, further comprising thermal elements that are used to control a temperature of the substrate.

14. A radiation detection sensor as defined in claim 13, wherein the thermal elements comprise thermoelectrical coolers.

15. A radiation detection sensor comprising a radiation detector on a substrate, wherein the radiation detector is segmented into an array of mapping elements such that individual mapping elements are substantially thermally isolated from each other and comprise pixels of a passively produced color visual thermal energy map.

16. A radiation detection sensor as defined in claim 15, wherein the radiation detectors within the array of mapping elements are minimally connected to adjacent radiation detectors.

17. A radiation detection sensor assembly comprising:
collection optics that direct radiated energy from an object to a sensor surface;
a plurality of mapping elements substantially at the sensor surface, the mapping elements configured such that each includes a thermal conversion material that converts the directed radiated energy into heat energy, and such that the plurality of mapping elements passively provides a color visual thermal energy map corresponding to the radiated energy received from the object;
imaging optics that receive light from the plurality of mapping elements corresponding to the color visual thermal energy map; and
an image sensor that receives light from the imaging optics and produces an image corresponding to the color visual thermal energy map.

18. A radiation detection sensor as defined in claim 17, further comprising a light source that illuminates the plurality of mapping elements such that the image sensor receives reflected light from the mapping elements.

19. A method of radiation detection comprising:
receiving radiated energy from an object and directing the radiated energy to a sensor surface;
converting the received energy into thermal energy at the sensor surface so as to passively produce a color visual thermal energy map corresponding to the received radiated energy; and
detecting reflected light received from the sensor surface.

20. A method as defined in claim 19, wherein detected reflected light comprises producing an image from the reflected light such that the produced image corresponds to the color visual thermal energy map.

* * * * *